United States Patent
Yadav

(10) Patent No.: US 9,996,402 B2
(45) Date of Patent: Jun. 12, 2018

(54) SYSTEM AND METHOD FOR IMPLEMENTING SCALABLE ADAPTIVE READER-WRITER LOCKS

(71) Applicant: Oracle International Corporation, Redwood City, CA (US)

(72) Inventor: Rahul Yadav, Santa Clara, CA (US)

(73) Assignee: Oracle International Corporation, Redwood City, CA (US)

( * ) Notice: Subject to any disclaimer, the term of this patent is extended or adjusted under 35 U.S.C. 154(b) by 123 days.

(21) Appl. No.: 14/246,975

(22) Filed: Apr. 7, 2014

(65) Prior Publication Data

US 2015/0286586 A1    Oct. 8, 2015

(51) Int. Cl.
*G06F 9/52* (2006.01)
*G06F 12/08* (2016.01)
*G06F 12/14* (2006.01)
*G06F 12/0842* (2016.01)
*G06F 12/0811* (2016.01)

(52) U.S. Cl.
CPC .............. *G06F 9/528* (2013.01); *G06F 9/526* (2013.01); *G06F 12/0842* (2013.01); *G06F 12/1466* (2013.01); *G06F 12/0811* (2013.01)

(58) Field of Classification Search
None
See application file for complete search history.

(56) References Cited

U.S. PATENT DOCUMENTS

| 5,317,737 | A | * | 5/1994 | Barton | G06F 9/526 |
| | | | | | 710/200 |
| 6,289,369 | B1 | | 9/2001 | Sundaresan | |
| 6,480,918 | B1 | | 11/2002 | Mckenney et al. | |
| 6,546,443 | B1 | * | 4/2003 | Kakivaya | G06F 9/524 |
| | | | | | 710/108 |

(Continued)

FOREIGN PATENT DOCUMENTS

WO    1997006484    2/1997

OTHER PUBLICATIONS

McKusick, M.; "An Overview of Locking in the FreeBSD Kernel'" BSDCan Conference 2012; (May 11, 2012).*

(Continued)

*Primary Examiner* — Mano Padmanabhan
*Assistant Examiner* — William E. Baughman
(74) *Attorney, Agent, or Firm* — Robert C. Kowert; Meyertons, Hood, Kivlin, Kowert & Goetzel, P.C.

(57) ABSTRACT

NUMA-aware reader-writer locks may leverage lock cohorting techniques and may support reader re-entrancy. They may implement a delayed sleep mechanism by which a thread that fails to acquire a lock spins briefly, hoping the lock will be released soon, before blocking on the lock (sleeping). The maximum spin time may be based on the time needed to put a thread to sleep and wake it up. If a lock holder is not executing on a processor, an acquiring thread may go to sleep without first spinning. Threads put in a sleep state may be placed on a turnstile sleep queue associated with the lock. When a writer thread that holds the lock exits (Continued)

a critical section protected by the lock, it may wake all sleeping reader threads and one sleeping writer thread. Reader threads may increment and decrement node-local reader counters upon arrival and departure, respectively.

20 Claims, 12 Drawing Sheets

(56) References Cited

U.S. PATENT DOCUMENTS

| | | | |
|---|---|---|---|
| 6,578,131 B1 | 6/2003 | Larson et al. | |
| 6,594,683 B1 | 7/2003 | Furlani et al. | |
| 6,965,961 B1 | 11/2005 | Scott | |
| 6,985,984 B2 | 1/2006 | Radovic et al. | |
| 7,318,128 B1 | 1/2008 | Dice et al. | |
| 7,487,279 B2 | 2/2009 | Su | |
| 7,529,844 B2 | 5/2009 | Radovic et al. | |
| 7,562,204 B1* | 7/2009 | Cholleti | G06F 12/1072 711/163 |
| 7,594,234 B1* | 9/2009 | Dice | G06F 9/526 718/100 |
| 7,979,617 B2 | 7/2011 | Mckenney et al. | |
| 7,984,444 B1 | 7/2011 | Shavit et al. | |
| 2003/0041173 A1 | 2/2003 | Hoyle | |
| 2003/0195920 A1 | 10/2003 | Brenner et al. | |
| 2003/0236817 A1 | 12/2003 | Radovic et al. | |
| 2005/0114609 A1 | 5/2005 | Shorb | |
| 2006/0136516 A1 | 6/2006 | Jain et al. | |
| 2007/0039000 A1 | 2/2007 | Lakshmikantha et al. | |
| 2007/0239915 A1* | 10/2007 | Saha | G06F 9/526 710/200 |
| 2007/0271450 A1* | 11/2007 | Doshi | G06F 9/526 712/245 |
| 2008/0209433 A1 | 8/2008 | McKenney | |
| 2008/0320262 A1 | 12/2008 | McKenney et al. | |
| 2009/0125548 A1 | 5/2009 | Moir et al. | |
| 2009/0328053 A1 | 12/2009 | Dice | |
| 2010/0114849 A1 | 5/2010 | Kingsbury et al. | |
| 2010/0275209 A1* | 10/2010 | Detlefs | G06F 9/526 718/102 |
| 2010/0333096 A1 | 12/2010 | Dice et al. | |
| 2012/0198454 A1 | 8/2012 | Dawson et al. | |
| 2012/0311606 A1 | 12/2012 | Marathe et al. | |
| 2013/0173869 A1 | 7/2013 | Saha et al. | |
| 2013/0290967 A1* | 10/2013 | Calciu | G06F 9/526 718/102 |
| 2014/0258645 A1* | 9/2014 | Dice | G06F 9/528 711/152 |

OTHER PUBLICATIONS

Mauro, J. "Inside Solaris—Turnstiles and priority inheritance," SunWorldOnline; Aug. 1999.*
U.S. Appl. No. 13/458,868, filed Apr. 27, 2012, Irina Calciu.
John M. Mellor-Crummey, and Michael L. Scott, "Scalable Reader-Writer Synchronization for Shared-Memory Multiprocessors", PPoPP 1991. pp. 1-8.
"NUMA-Aware locking routines—design and implementation in Linux" downloaded from—sc.tamu.edu/ whitepapers/altix/ numalocks.pdf, pp. 1-10, 2009.
S. Blagodurov, S. Zhuravlev, M. Dashti, A. Fedorova, "A case for NUMA-aware contention management on multicore systems"In Proceedings of USENIX Annual Technical Conference 2011, pp. 1-448.
A. Agarwal and M. Cherian. "Adaptive backoff synchronization techniques". SIGARCH Comput. Archit. News, 17:396-406, Apr. 1989.
T. Craig. "Building FIFO and priority-queueing spin locks from atomic swap". Technical Report TR 93-02-02, University of Washington, Dept of Computer Science, Feb. 1993. pp. 1-29.
D. Dice and A. Garthwaite. "Mostly Lock Free Malloc". In Proceedings of the 3rd International Symposium on Memory Management, pp. 163-174, 2002.
D. Dice, V. Marathe, and N. Shavit. "Flat Combining NUMA Locks". In Proceedings of the 23rd ACM Symposium on Parallelism in Algorithms and Architectures, 2011. pp. 1-10.
D. Hendler, I. Incze, N. Shavit, and M. Tzafrir. "Flat Combining and the Synchronization-Parallelism Tradeoff". In Proceedings of the 22nd ACM Symposium on Parallelism in Algorithms and Architectures, pp. 355-364, 2010.
J. Mellor-Crummey and M. Scott. "Algorithms for scalable synchronization on shared-memory multiprocessors". ACM Trans. Computer Systems, 9(1 ):21-65, 1991.
M. Pohlack and S. Diestelhorst. "From Lightweight Hardware Transactional Memory to LightWeight Lock Elision". In Proceedings of the 6th ACM SIGPLAN Workshop on Transactional Computing, 2011. pp. 1-7.
Z. Radovic and E. Hagersten. "Hierarchical Backoff Locks for Nonuniform Communication Architectures". In HPCA-9, pp. 241-252, Anaheim, California, USA, Feb. 2003. pp. 1-12.
M. Scott and W. Scherer. "Scalable queue-based spin locks with timeout". In Proc. 8th ACM SIGPLAN Symposium on Principles and Practices of Parallel Programming, pp. 44-52, 2001.
M. L. Scott. "Non-blocking timeout in scalable queue-based spin locks." In Proceedings of the twenty-first annual symposium on Principles of distributed computing, PODC '02, pp. 31-40, New York, NY, USA, 2002. ACM.
Victor Luchangco and Dan Nussbaum and Nir Shavit. "A Hierarchical CLH Queue Lock". In Proceedings of the 12th International Euro-Par Conference, pp. 801-810, 2006.
Oyama, Taura, Yonezawa. "Executing Parallel Programs with Synchronization Bottlenecks Efficiently". University of Tokyo, 1998. Downloaded from—web.yl.is.s.u-tokyo.ac.jp/~oyama/publications/ OyamaPDSIA99.pdf. pp. 1-23.
Yossi Lev, Victor Luchangco, and Marek Olszewski. "Scalable Reader-Writer Locks." SPAA 2009. pp. 1-10.
John M. Mellor-Crummey, and Michael L. Scott. "Scalable Reader-Writer Synchronization for Shared-Memory Multiprocessors-" pp. 1991. Pages 1-8.
John M. Mellor-Crummey, and Michael L. Scott. "Synchronization without contention" ASPLOS 1991. pp. 1-10.
P. J. Courtois, F. Heymans. and D. L. Parnas. "Concurrent Control with 'readers' and 'writers'" CACM 1971. pp. 1-9.
W. C. Hsieh, and W. E. Weihl. "Scalable reader-writer locks for parallel systems." IPPS 1992. pp. 1-22.
0. Krieger, M. Stumm, R. Unrau, and J. Hanna. "A fair fast scalable reader-writer lock" ICPP 1993. pp. 1-4.
D. Dice and N. Shavit. "TLRW: Return of the Read-Write Lock." SPAA 2010. pp. 1-9.
F. Ellen, Y. Lev, V. Luchangco, and M. Moir. "SNZI: Scalable Non-Zero Indicators". PODC 2007. pp. 1-10.
U.S. Appl. No. 13/458,871, filed Apr. 27, 2012, David Dice et al.
Numa-aware reader-writer locks by Irina Calciu, Dave Dice, Yossi Lev, Victor Luchangco, Virendra J. Marathe, and Nir Shavit. Proceedings of the 18th ACM SIGPLAN symposium on Principles and practice of parallel programming, PPoPP '13, pp. 157-166, New York, NY, 2013.

* cited by examiner

SYSTEM AND METHOD FOR IMPLEMENTING SCALABLE ADAPTIVE READER-WRITER LOCKS

BACKGROUND

Field of the Disclosure

This disclosure relates generally to reader-writer locks, and more particularly to systems and methods for implementing scalable adaptive reader-writer locks.

Description of the Related Art

In a multiprocessor environment with threads and pre-emptive scheduling, threads can participate in a mutual exclusion protocol through the use of lock or "mutex" constructs. A mutual exclusion lock can either be in a locked state or an unlocked state, and only one thread can hold or own the lock at any given time. The thread that owns the lock is permitted to enter a critical section of code protected by the lock or otherwise access a shared resource protected by the lock. If a second thread attempts to obtain ownership of a lock while the lock is held by a first thread, the second thread will not be permitted to proceed into the critical section of code (or access the shared resource) until the first thread releases the lock and the second thread successfully claims ownership of the lock.

Current trends in multicore architecture design imply that in coming years, there will be an accelerated shift away from simple bus-based designs towards distributed non-uniform memory-access (NUMA) and cache-coherent NUMA (CC-NUMA) architectures. Under NUMA, the memory access time for any given access depends on the location of the accessed memory relative to the processor. Such architectures typically consist of collections of computing cores with fast local memory (as found on a single multicore chip), communicating with each other via a slower (inter-chip) communication medium. In such systems, the processor can typically access its own local memory, such as its own cache memory, faster than non-local memory. In some systems, the non-local memory may include one or more banks of memory shared between processors and/or memory that is local to another processor. Access by a core to its local memory, and in particular to a shared local cache, can be several times faster than access to a remote memory (e.g., one located on another chip). Note that in various descriptions herein, the term "NUMA" may be used fairly broadly. For example, it may be used to refer to non-uniform communication access (NUCA) machines that exhibit NUMA properties, as well as other types of NUMA and/or CC-NUMA machines.

On large cache-coherent systems with Non-Uniform Memory Access (CC-NUMA, sometimes shortened to just NUMA), if lock ownership migrates frequently between threads executing on different nodes, the executing program can suffer from excessive coherence traffic, and, in turn, poor scalability and performance. Furthermore, this behavior can degrade the performance of other unrelated programs executing in the system.

Reader-writer locks are an important category of locks that help programmers overcome the scalability issues that are common with traditional mutual exclusion locks for workloads that include a significant percentage of read-only critical sections of code. At any given time, a reader-writer lock allows one or more reader threads to own a lock in a read-only mode or just one writer thread to own the lock in a write mode. In one very basic implementation of a reader-writer lock, there is a single variable to indicate the synchronization object. When there are multiple simultaneous lock acquisitions in read-only mode, this variable indicates number of reader threads. However, when there is an exclusive lock acquisition for writer thread, this variable indicates an address or other identifier of the writer thread.

With reader-writer locks, read-only or write access permission persists until it is explicitly surrendered using an unlock operation. Past research has shown that even though these locks can scale well for workloads with very high reader volumes (e.g., on the order of 99-100% reader threads), the performance quickly drops off with even a modest number of writer threads (e.g., 5-10%) competing for the lock. This drop-off can be expected to be even worse on cache-coherent NUMA architectures, where the writer threads can introduce significant interconnect traffic and latencies to access remotely situated lock metadata and data that is accessed in a related critical section of code. A reader-writer lock might provide better performance than a traditional mutex, as the reader-writer lock can admit multi-reader (reader-reader) parallelism. However, any actual benefit would be contingent on the workload of the executing application, the availability of true parallelism, and the specific implementation of the reader-writer lock.

SUMMARY

In various embodiments, NUMA-aware reader-writer locks that control access to critical sections of code by concurrently executing threads in read-only mode and in write mode may leverage lock cohorting techniques to band together writer requests that originate from a single NUMA node. These locks may relax the order in which the execution of critical sections of code by reader threads and writer threads is scheduled, allowing lock ownership to remain resident on a single NUMA node for long periods, while also taking advantage of parallelism between reader threads. These reader-writer locks may follow a writer-preference policy, a reader-preference policy or a hybrid policy when determining the order in which threads are granted the locks for reading or writing. In some embodiments, if a given thread that wishes to acquire one of the NUMA-aware reader-writer locks determines that another thread has already acquired the lock or has indicated an intent to acquire the lock, the action taken on behalf of the given thread in response may be determined from among the available options (e.g., blocking, spinning, and/or acquiring the lock) dependent on whether the given thread is a reader thread or a writer thread, dependent on whether the other thread (a current lock holder) is a reader thread or a writer thread, and/or dependent on whether the other thread is currently executing the critical section of code on a processor core In some embodiments, the NUMA-aware reader-writer locks described herein may implement a delayed sleep mechanism by which a thread that fails to acquire a lock on its first attempt may spin briefly, in the hope that the lock will be released soon, before blocking on the lock (e.g., sleeping). For example, a reader thread that wishes to acquire a lock in read-only mode that has been acquired by a writer thread (or for which a writer thread has indicated an intent to acquire the lock) may spin on a write mutex field of the lock structure until it no longer indicates that a writer thread holds (or intends to acquire) the lock for writing. In another example, a writer thread that wishes to acquire a lock in write mode that has been acquired by one or more reader threads may spin on an indication of the number of reader threads that hold the lock until it indicates that no reader threads hold the lock. In yet another example, a writer thread that wishes to acquire a lock in write mode that has been acquired by one or more reader threads may spin for a pre-determined amount of time and re-try its attempt to acquire the lock before blocking on the lock (e.g., sleeping). The maximum spin time for a reader thread to spin (sometimes referred to herein as the reader patience threshold value) and/or the pre-determined spin time for a writer thread (sometimes referred to herein as the writer patience value) may be based on the time needed to put a thread to sleep and/or the time needed to wake it back up. In some embodiments, the acquiring thread may employ this delayed sleep mechanism if (and only if) the lock holder is currently executing on a processor when the acquiring thread initiates its attempt to acquire the lock, in which case it may be assumed that the lock holder will release the lock relatively soon.

In some embodiments, if the lock holder is not currently executing on a processor when another thread initiates an attempt to acquire the lock, the acquiring thread may go to sleep without first spinning Threads put in a sleep state may be placed on a turnstile sleep queue (or another similar structure) that is associated with the lock, to be woken up later by an exiting lock holder. When a writer thread that holds the lock exits the lock (or exits a critical section protected by the lock), it may wake any and all sleeping reader threads (which may all acquire the lock in read-only mode and may all hold the lock for reading at the same time) and may also wake one sleeping writer thread (which may attempt to acquire the lock, but may need to spin while the readers drain before being able to acquire the lock).

In some embodiments, a read indicator portion of the NUMA-aware reader-writer locks described herein may be implemented as a distributed collection of node-local reader counters. In such embodiments, reader threads may increment and decrement their node-local reader counters upon arrival and departure, respectively. In addition, writer threads may determine that one or more readers currently hold a NUMA-aware reader-writer lock by determining that an aggregate value representing the sum of the values of these node-local reader counters is non-zero. In some embodiments, the NUMA-aware reader-writer locks described herein may support reader re-entrancy. In such embodiments, a reader thread that has exited a critical section protected by the lock but has not yet released the lock may attempt to re-acquire the lock (e.g., calling a lock acquisition function) without first releasing it. In some such embodiments, each thread may maintain a linked list of locks that it has taken in read-only mode.

Figure 1:
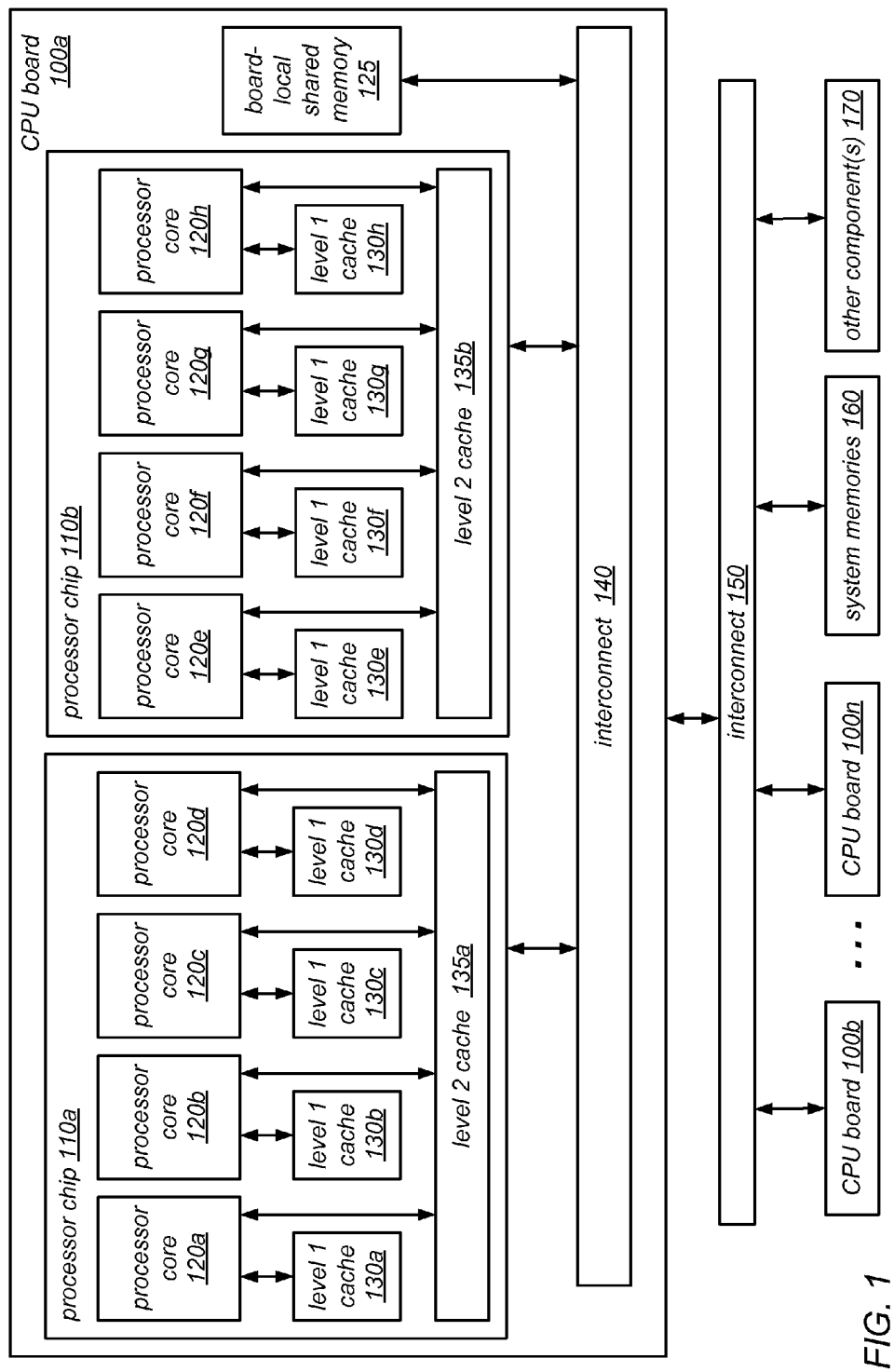
FIG. 1 is a block diagram illustrating a portion of a computer system that implements a NUMA style memory architecture, according to some embodiments.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

As noted above, reader-writer locks are a class of mutual exclusion locks that permit simultaneous acquisition by more than one thread that intends to access the data protected by the locks in read-only mode or exclusive acquisition by one thread that requires write access to the data protected by the locks. The use of reader-writer locks may enable significantly greater concurrency (as compared to traditional mutual exclusion locks) between threads that acquire a reader-writer lock in read-only mode, and may thus result in much better scalability than can be achieved using traditional mutual exclusion locks. For example, in some embodiments, reader-writer lock may can scale well even on systems having many thousands of CPUs.

Broadly, reader-writer locks may be thought of in terms of a packing problem in which time passing is indicated on the X-axis and critical section occupation by process (or CPU) count is indicated on the y-axis. For a given reader-writer lock, for any given point or time interval, a goal may be to maximize the number of active reader threads. In this example, the area under the curve may reflect the throughput of the system. A goal may be to maximize throughput, while taking into account some constraints on fairness, where "fairness" may be thought of as the difference between arrival order and admission (entry) order over some interval (e.g., how far a lock deviates from strict FIFO ordering). Note that maximizing throughput may be thought of as equivalent to minimizing execution time. For example, if there is a backlog of pending read and write requests, a goal may be for the lock algorithm to schedule operations so that the backlog, plus any new requests that arrive, will be completed as soon as possible. In some embodiments, this may be achieved by "packing" reader threads so that multiple reader threads can run at the same time.

In the example descriptions included herein, it may be assumed that the system scheduler is fair and that the system is otherwise unloaded. It may also be assumed that the arrival rate at a lock is approximately uniform over the nodes in a system. In addition, it may be assumed that some amount of temporal reuse locality exists between critical section activations for the same lock. In other words, acquiring a lock L may be assumed to be a good predictor that the critical section that runs under lock L will access much of the same data as recent previous activations of critical sections that ran under lock L. In various embodiments, the thread scheduling criteria employed in the system may include the arrival time of the thread relative to other threads (e.g., its age), the NUMA origin of the invoking thread, and/or the type of operation (e.g., whether the thread intends to perform a read operation or a write operation).

In the descriptions that follow, an "R-group" may be defined as a set of active reader threads that execute concurrently. More precisely, an R-group may be defined as the transitive closure of a set of active reader threads that overlap in time. Increasing parallelism between reader threads (sometimes referred to herein as "reader-reader parallelism", or simply "R-R parallelism") may be equivalent to increasing R-group sizes. A write-after-read (WAR) event occurs when an R-group finishes (i.e. when all of the reader threads in the R-group complete execution) and a writer thread executes. Note that each WAR event corresponds to an adjoining read-after-write (RAW) event. However, without loss of generality, the discussions that follow are restricted to the consideration of RAW events. High RAW rates may tend to decrease R-group sizes and limit R-R parallelism, since RAW alternation can disrupt strings of pending reader threads that could potentially run concurrently. Therefore, in some embodiments, for better performance, the rates of read-to-write and write-to-read alternation should be reduced. For the purposes of the discussions below, the following may be considered to be equivalent (i.e. to be equally beneficial to performance): increasing the size of an R-group, increasing R-R parallelism, and decreasing the read-after-write RAW alternation rate.

In some embodiments, a reader-writer lock implementation may incorporate policies that promote or otherwise encourage large R-group formation. For example, one tactic employed by these locks may be to allow a bounded number of reader threads to bypass or overtake writer threads that are blocked by an active R-group. In such embodiments, a newly arriving reader thread may be allowed to "jump over" the pending writer threads and join an active R-group. For example, if the arrival order at a reader-writer lock is as follows: reader thread r1, writer thread w1, reader thread r2, writer thread w2, reader thread r3, writer thread w3, reader thread r4, writer thread w4, reader thread r5, writer thread w5. In this example, the reader-writer lock may opt to reorder or reschedule the admission order as follows: writer thread w1, writer thread w2, writer thread w3, writer thread w4, writer thread w5, (reader thread r1, reader thread r2, reader thread r3, reader thread r4, reader thread r5), and the reader thread rX read operations may be able to run concurrently. As illustrated in this example, in some embodiments, a reader-writer lock may intentionally introduce and leverage unfairness in order to improve aggregate throughput.

As previously noted, Non-Uniform Memory Access (NUMA) architectures are gaining importance in mainstream computing systems due to the rapid growth of multi-core multi-chip machines. As microprocessor vendors aggressively pursue the production of bigger multi-core multi-chip systems, the computing industry is witnessing a shift toward distributed and cache-coherent NUMA architectures. As noted above, the term NUMA may be used broadly to include Non-Uniform Communication Architecture (NUCA) machines as well as Non-Uniform Memory Access architectures. These systems contain multiple nodes where each node has locally attached memory, a local cache and multiple processing cores. Such systems present a uniform programming model where all memory is globally visible and cache-coherent. The set of cache-coherent communications channels between nodes may be referred to collectively as the interconnect. These inter-node links may typically suffer from higher latency and lower bandwidth compared to intra-node channels. To decrease latency and to conserve interconnect bandwidth, NUMA-aware policies may encourage intra-node communication over inter-node communication.

Creating efficient software for NUMA systems may be challenging because such systems may present a naïve, uniform "flat" model of the relationship between processors and memory, hiding the actual underlying topology from the programmer. To create software for these systems, the programmer may need to study architecture manuals and use special system-dependent library functions to exploit the system topology. NUMA-oblivious multithreaded programs may suffer performance problems arising from long access latencies caused by inter-node coherence traffic and from interconnect bandwidth limits. Furthermore, since inter-node interconnect bandwidth is a shared resource, coherence traffic generated by one thread may impede the performance of other unrelated threads because of queuing delays and/or channel contention.

Extracting the best possible performance from NUMA machines may require the re-design of the concurrent algorithms, concurrent data structures, and/or synchronization primitives that form the building blocks of many of today's applications. One of the synchronization primitives traditionally used in parallel programs that may be adapted for use on NUMA machines is a reader-writer lock. Some examples of the adaptation of reader-writer locks for use on NUMA machines are described in "Numa-aware reader-writer locks" by Irina Calciu, Dave Dice, Yossi Lev, Victor Luchangco, Virendra J. Marathe, and Nir Shavit (in Proceedings of the 18th ACM SIGPLAN symposium on Principles and practice of parallel programming, PPoPP '13, pages 157-166, New York, N.Y., 2013). In various embodiments, the techniques described herein for implementing a scalable, adaptive reader-writer lock (e.g., using a delayed sleep mechanism, an early wake-up mechanism, and/or an adaptive sleep mechanism) may be applied to these and other reader-writer locks. A basic implementation of a reader-writer lock (e.g., one in which there is a single variable to indicate the synchronization object) may not be scalable on large machines that include multiple processor cores located on multiple processor chips implemented on multiple computing nodes. For example, because threads executing on different ones of the processors access a single variable, a lot of cross-coherence traffic may be generated to access the latest copy of that single variable, which may degrade performance significantly. In some embodiments, more complex reader-writer locks may be distributed in nature. For example, instead of having only one single variable, the synchronization object may be made up of multiple variables, and a thread may choose which variable to access or modify in order to acquire the lock. This distributed approach may reduce the cross-coherence traffic if the variable is chosen wisely. The number of individual variables employed in such systems may be chosen based on the number of processor chips, the number of processor cores, and/or the number of computing nodes in the system, in different embodiments.

In some embodiments, the reader-writer lock algorithms described herein may provide better performance in NUMA architectures than standard implementations of reader-writer locks, as they may take into account the effects of NUMA architectures on reader-writer locks. In other words, by modifying reader-writer locks for better scaling on NUMA machines, as described herein, the performance of multi-threaded applications on such architectures may be further improved. Variations of these locks, several of which are described herein, may trade fairness between readers and writers for higher concurrency among readers and better back-to-back batching of writers from the same NUMA node. In various embodiments, these reader-writer locks may leverage a lock cohorting technique to manage synchronization between writer threads in a NUMA-friendly fashion (e.g., to band together the writer requests coming from a single NUMA node), may employ binary flags to coordinate readers and writers, and/or may employ distributed reader counters to enable NUMA-friendly concurrency among readers. These NUMA-aware algorithms have been shown to outperform previous reader-writer locks by up to a factor of 10 in various microbenchmark experiments. For example, they have been evaluated using a benchmark of an open-source database that makes heavy use of reader-writer locks, and have been shown to boost the performance of the benchmark by up to 40% over some of the best prior alternatives.

As noted above, a reader-writer lock may relax the central property of traditional mutual exclusion (mutex) locks by allowing multiple threads to hold the lock simultaneously in read-only mode. A thread may also acquire the lock in write mode for exclusive access. Reader-writer locks are used in a wide range of settings including operating system kernels, databases, high-end scientific computing applications and software transactional memory implementations. Existing algorithms for implementing reader-writer locks may include simple counter- or semaphore-based solutions, solutions leveraging centralized wait-queues, or solutions that use more sophisticated data structures such as Scalable Non-Zero Indicators (SNZI objects). Many of these previous approaches (other than the SNZI-based solutions) may rely on centralized structures to coordinate threads, and may thus encounter scalability impediments. In some embodiments, the SNZI-based algorithms may keep track of reader threads (threads acquiring the reader-writer lock in read-only mode) with each reader thread arriving at a leaf in a "SNZI tree". In some embodiments, readers may be made NUMA-aware by partitioning the leaves of the SNZI-tree among NUMA nodes, with threads arriving at SNZI leaves associated with their node. Writers, however, may remain NUMA-oblivious, which can impair scalability.

In another "distributed" approach to building scalable reader-writer locks, each distributed reader-writer lock may contain N reader-writer locks where N may be equal to the number of processors in the system. In this approach, each reader thread is mapped to a single reader-writer lock, and must acquire that lock in read-only mode in order to execute its critical section. A writer thread must acquire all of the underlying reader-writer locks in write mode to execute its critical section. Deadlocks between writers are avoided by forcing a specific locking order. In some embodiments, this approach may be made NUMA-aware by restricting N to the number of NUMA nodes in the system, and mapping each reader to the lock dedicated to its node. This variant algorithm may be considered to be partially NUMA-aware, just like the SNZI-based reader-writer locks. In this variant, absent any writer threads, reader threads on different nodes may obtain and release read permission without generating any inter-node write coherence traffic. However, every writer thread may incur the overhead of acquiring write permission for the reader-writer lock of every node, potentially generating significant coherence traffic. Thus, the performance of this variant may plummet with increased writer activity. In addition, because of the canonical locking order used to avoid deadlock, reader threads on nodes that appear late in the order may enjoy an unfair performance advantage over reader threads running on nodes that appear earlier.

In various embodiments, the reader-writer locks described herein may be designed to leverage NUMA features and deliver better performance and scalability than prior reader-writer lock algorithms. In some embodiments, a distributed structure may be maintained for reader metadata such that reader threads denote their intent to acquire the reader-writer lock in read-only mode by updating only locations associated with their nodes (e.g., node-local read indicator structures or node-local reader counters). By localizing updates to read indicators coherence traffic may be reduced on the interconnect.

As noted above, in some embodiments, the NUMA-aware reader-writer lock algorithms described herein may employ a lock cohorting technique. In such embodiments, writer threads may use a cohort lock to synchronize with each other and to maintain writer-vs.-writer exclusion. For example, using the cohort locking approach, a writer releasing the lock may preferentially hand off access permission to a pending local writer thread (e.g., a blocked writer thread executing on the same node), if there is one. This may enhance reference locality in the node's cache for both the lock metadata and the data accessed in the critical section it protects, reducing lock migrations between nodes. As used here herein, the term "lock migration" may refer to a situation in which the lock is consecutively acquired by threads residing on distinct NUMA nodes. On a cache-coherent NUMA system, lock migration leads to the transfer of cache lines (both for lines underlying the lock metadata as well as for lines underlying mutable data accessed in the critical section protected by the lock) from the cache associated with the first thread to that of the second thread. In some embodiments, the NUMA-aware reader-writer lock algorithms described herein may maintain tight execution paths for both reader threads and writer threads, which may reduce latency of the lock acquisition and/or lock release operations.

In some embodiments, the NUMA-aware reader-writer locks described herein may include distributed implementations of a read indicator, e.g., a data structure that tracks the existence of reader threads using per-node read indictor elements. For example, in some embodiments, reader threads may "arrive" at node-local reader counters during lock acquisition and may "depart" from them during lock release. Writer threads may query the read indicator (or its reader counters) to detect concurrently active readers. Because of the distributed nature of the read indicator, the reader threads may need only access the node-specific metadata of the lock. As described herein, the NUMA-aware reader-writer locks may use binary flags (such as the bRaised and WActive flags included in the pseudo-code below) and checks for coordination between reader threads and writer threads. Together, these mechanisms may be used to implement a family of lock algorithms that push the performance envelope of reader-writer locks on NUMA systems far beyond that of prior reader-writer lock algorithms.

Several example NUMA-aware reader-writer locks in this family are described herein, and they may be differentiated from each other based on the fairness properties they provide. In particular, these locks may exhibit different "preference" policies, e.g., a reader-preference policy, a writer-preference policy, and a neutral-preference policy. A reader-preference policy may dictate that reader threads should acquire (i.e., be granted) the NUMA-aware reader-writer lock as early as possible, regardless of their arrival order, whereas a writer-preference policy may have a symmetric bias towards writer threads. More specifically, these preference policies may allow reader threads or writer threads to "bypass" prior pending writer threads or reader threads (respectively) in the race to acquire the lock. These preference policies (other than the neutral policy) may lead to starvation of threads engaged in the non-preferred lock acquisition operation. However, in some embodiments, such starvation may be avoided by allowing the lock mechanism to temporarily override the preference policy so as to allow forward progress of starving threads. In other words, starving threads may become "impatient" and transiently change the preference policy.

Lock Design

NUMA-aware mutex lock designs are primarily directed to the reduction of the lock migration frequency so as to generate better node-local locality of reference for the lock and the critical section it protects. NUMA-aware mutex locks may act to reduce the rate of write invalidations and coherence misses satisfied by cache-to-cache transfers from remote caches via the interconnect. In some embodiments, the NUMA-aware reader-writer lock designs described herein may additionally address the complementary goal of maximizing reader-reader concurrency.

Note that there may be an interesting tension between these two goals. For example, promoting concurrent reader-reader sharing across NUMA nodes may tend to lead to designs that "spread" the lock metadata and critical section data across these nodes, whereas reducing the lock migration rate may tend to significantly curtail this spread. However, this apparent contradiction between these goals may be effectively reconciled by using a policy that attempts to reduce lock migrations only between writers, while at the same time maximizing concurrency between readers. In order for this strategy to be most effective, the algorithms described herein may aggressively "batch" the concurrent writer locking requests coming from a single NUMA node and may maintain a high local writer-to-writer lock hand off rate. Note that this aggressive writer batching approach may complements the goal of maximizing reader-reader concurrency because the latter may benefit significantly by aggressively aggregating (co-scheduling) reader locking requests. The potential benefits of these design goals may be further illustrated in various examples described herein.

FIG. 1 is a block diagram illustrating portion of a computer system that implements a NUMA style memory architecture, according to one embodiment. For example, the computer system illustrated in FIG. 1 includes multiple CPU boards 100 (shown as 100a-100n) that communicate with each other over interconnect 150. In this example, each of the CPU boards (which include a shared board-local memory 125) may be considered a node in the NUMA system, while in other embodiments, each node of a NUMA system may be a socket or die that includes multiple processor cores that share memory. One of these CPU boards (100a) is illustrated in more detail than the others. In some embodiments, each of the CPU boards 100 may include the same or a similar architecture as that illustrated for CPU board 100a. In other embodiments, each of the CPU boards may include a different number and/or arrangement of processor cores, caches, etc. As illustrated in FIG. 1, the computer system may also include one or more system memories 160 and/or other components 170. In this example, CPU board 100a includes two processor chips (shown as processor chips 110a and 110b) that communicate with each other and with shared memory 125 over interconnect 140. In this example, processor chips 110a and 110b include a similar architecture.

In the example illustrated in FIG. 1, processor chip 110a includes four processor cores (shown as 120a-120d), and each processor core has a respective (dedicated) level 1 (L1) cache (shown as 130a-130d). Similarly, processor chip 110b includes four processor cores (shown as 120e-120h), and each processor core has a respective (dedicated) level 1 (L1) cache (shown as 130e-130h). Each processor core may be a multi-threaded core, in some embodiments. For example, in one embodiment each processor core may be capable of concurrently executing eight hardware threads.

Inter-thread communication via local caches (e.g., L1 and L2 caches) may be significantly faster than inter-thread communication via remote caches because the latter involves cache coherence messages that are communicated across one or more of the interconnects 140 and 150. For example, the threads executing on a given processor core 120 may share the level 1 cache 130 for that processor core 120, and accesses to this level 1 cache, which may be considered local to the processor core 120 and its hardware threads, may be extremely fast. In addition, the four processor cores 120 of processor chip 110a may share the level 2 (L2) cache 135a for processor chip 110a, and accesses to this level 2 cache (by the four processor cores of processor chip 110a) may also be fast, although not as fast as those to each processor core's own level 1 cache. Similarly, the four processor cores 120 of processor chip 110b may share the level 2 (L2) cache 135b for processor chip 110b, and accesses to this level 2 cache (by the four processor cores of processor chip 110b) may also be fast, although not as fast as those to each processor core's own level 1 cache.

In this example, accesses to caches of a different processor chip 110 on the same CPU board 100, to caches of a processor chip 110 on a different CPU board 100, to a board-local shared memory 125 on a different CPU board 100, and/or to various system memories 160 (all of which may be considered remote accesses with respect to a hardware thread executing a particular processor core 120 of a processor chip on CPU board 100a) may exhibit increasingly higher latency, when compared to accesses to the level 1 and level 2 caches that are local to that hardware thread.

In some embodiments, threads executing in a NUMA system may execute critical sections that are protected by a reader-write lock and/or access shared resources that are protected by a reader-write lock. In one example (e.g., in the NUMA system illustrated in FIG. 1), six threads (referred to as threads r1-r6) may attempt to acquire a reader-writer lock L in read-only mode in order to execute a critical section, and six threads (referred to as threads w1-w6) may attempt to acquire the same lock L in write mode in order to execute a critical section. In this example, it is assumed that the critical sections protected by the lock L access the same shared data.

Figure 2A:
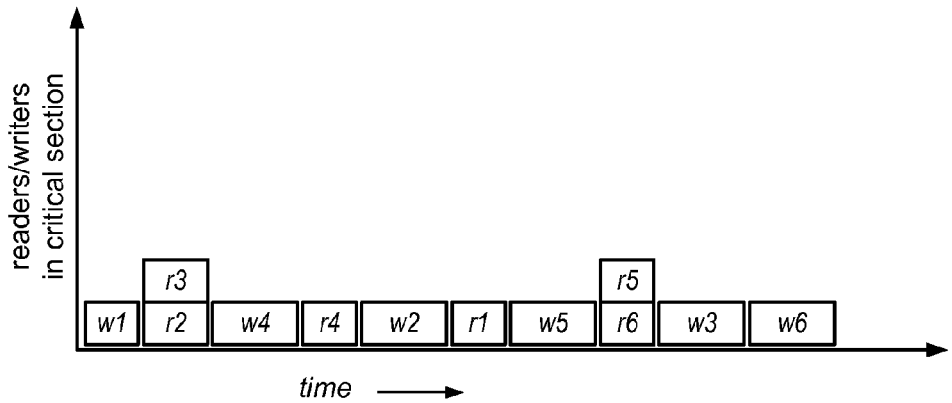
FIGS. 2A-2C illustrate different critical section execution scenarios for a variety of locking schedules, according to one embodiment.
Figure 2B:
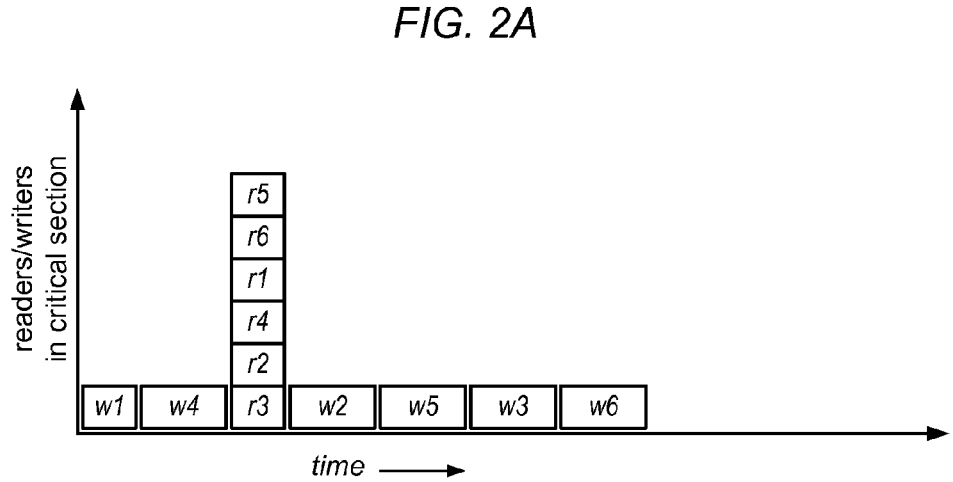
Figure 2C:
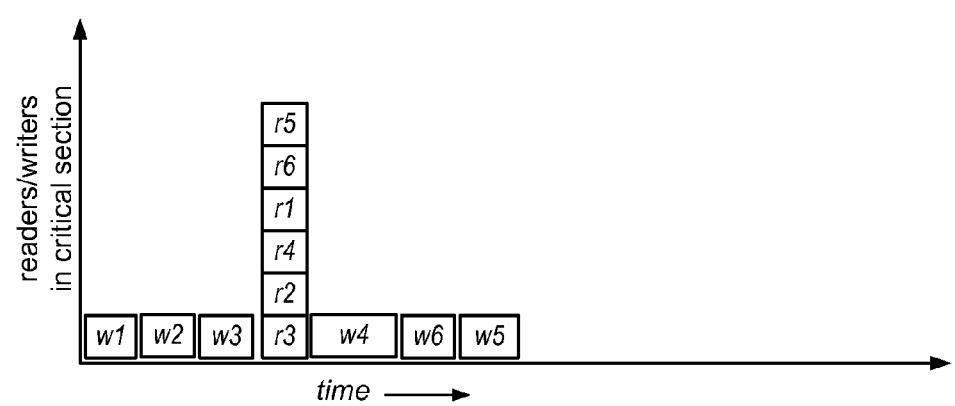

In various embodiments, the order in which the reader-writer lock is granted to concurrently executing threads may be dependent on the processor cores on which they are executing, on whether they are attempting to acquire the lock in read-only mode or in write mode, on the other threads that are also executing in the system, on the type of reader-writer lock they are attempting to acquire, on the scheduling policies employed in the particular NUMA system (or for the particular lock), and/or on the priority scheme implemented in the system (or for the lock). FIGS. 2A-2C illustrate various critical section execution schedules that may be possible for these readers and writers when the critical section is protected by different types of reader-writer locks (e.g., reader-writer locks with different scheduling or priority policies). In these examples, threads w1 and w2 are executing on processor core 120a; thread r3 is executing on processor core 120b; thread r2 is executing on processor core 120c; threads r1 and w3 are executing on processor core 120d; threads w4 and w5 are executing on processor core 120e; threads w6 and r5 are executing on processor core 120f; and threads r4 and r6 are executing on processor core 120g. In this example, no threads are currently executing on processor core 120h.

FIG. 2A illustrates a possible critical section execution schedule arbitrated by a naïve reader-writer lock that does not aggressively aggregate readers or provide back-to-back consecutive batching of writers from a given NUMA node, according to one embodiment. In this example, writer thread w1 (executing on processor core 120a) is scheduled for execution first, followed by reader threads r2 and r3 (which execute concurrently on processor cores 120c and 120b, respectively), writer thread w4 (executing on processor core 120e), reader thread r4 (executing on processor core 120g), writer thread w2 (executing on processor core 102a), reader thread r1 (executing on processor core 120d), writer thread w5 (executing on processor core 120e), reader threads r5 and r6 (which execute concurrently on processor cores 120f and 120g, respectively), writer thread w3 (executing on processor core 120d), and finally writer thread w6 (executing on processor core 120f). With this scheduling policy, the lock does not provide good reader-reader concurrency, and hence it takes more time to execute all the critical sections. Note that, in various embodiments, assuming a backlog of pending readers, higher rates of alternation between read and write modes may yield lower levels of reader-reader concurrency.

FIG. 2B illustrates a scheduling policy that yields improved reader-reader concurrency over the example illustrated in FIG. 2A through aggressive reader batching. In some embodiments, by aggressively aggregating read requests, the lock may successfully co-schedule a large group of readers, allowing them to execute the critical section concurrently (e.g., substantially in parallel). In this example, writer thread w1 (executing on processor core 120a) is scheduled for execution first, followed by writer thread w4 (executing on processor core 120e), reader threads r1-r6 (all of which execute concurrently on respective processor cores), writer thread w2 (executing on processor core 120a), writer thread w5 (executing on processor core 120e), writer thread w3 (executing on processor core 120d), and finally writer thread w6 (executing on processor core 120f). In this example, the scheduling of executing writers alternates between the two NUMA nodes illustrated FIG. 1. In some embodiments, this may lead to significant coherence traffic that slows down the writers. Note that, in these examples, the relative widths of the boxes in FIGS. 2A-2C may indicate the relative time taken to complete each of the critical section invocations, with broader boxes reflecting the overhead associated with inter-node communication latencies.

FIG. 2C illustrates a scheduling policy that addresses this issue through aggressive batching of both reader and writers. More specifically, a system that employs the scheduling policy illustrated in FIG. 2C may, in some embodiments, batch together writers from the same NUMA node for execution in a consecutive back-to-back fashion. In this example, writer thread w1 (executing on processor core 120a) is scheduled for execution first, followed by writer thread w2 (also executing on processor core 120a), writer thread w3 (executing on processor core 120d), reader threads r1-r6 (all of which execute concurrently on respective processor cores), writer thread w4 (executing on processor core 120e), writer thread w6 (executing on processor core 1200, and finally writer thread w5 (executing on processor core 120e).

As illustrated in this example, by applying a scheduling policy that implements aggressive batching of both reader and writers, some writer threads (e.g., writer threads w2, w3, w5, and w6) may incur fewer coherence misses during the execution of their critical sections than the number of coherence misses incurred during the execution of a critical section by other writer threads (e.g., writer thread w4). As noted above, this is indicated by the relative widths of the boxes in FIG. 2C. In various embodiments, the savings realized in taking this approach may translate to significant performance gains for reader-writer locks.

Reader-Writer Lock Algorithms

In the example NUMA-aware reader-writer lock designs described herein, each of the reader-writer lock instances includes a single central cohort mutual exclusion lock that is used to synchronize writers. In other words, writer-vs.-writer conflicts are resolved via the central cohort lock. In these examples, writer threads must acquire this cohort lock in order to gain exclusive write ownership of the reader-writer lock. Before executing the critical section, the writer thread that owns the cohort lock must also reconcile reader-vs.-writer conflicts by ensuring that there are no concurrent readers executing or about to execute their respective critical sections. In these examples, the readers portion of these reader-writer locks uses distributed read indicators (ReadIndr in the pseudo-code below). More specifically, ReadIndr is implemented as a distributed counter, with a reader counter per NUMA node. In these examples, to acquire a reader-writer lock in read-only mode, a reader thread must arrive at the lock's ReadIndr. Each reader thread increments its node-local reader counter during arrival and decrements the node-local reader counter during depart. In these examples, while writer threads update the central lock, they only query (but do not update) the distributed read indicators.

A Writer Cohort Lock

Lock cohorting is a technique used to compose NUMA-aware mutex locks from NUMA-oblivious mutex locks. Cohort locks may be hierarchical in structure, with one top-level lock and multiple locks at the second level, e.g., one for each node in a NUMA system. A cohort lock is said to be owned by a thread when that thread owns the top-level lock. In various embodiments, lock cohorting leverages the following two properties: (i) cohort detection, whereby a lock owner can determine whether there are additional threads waiting to acquire the lock; and (ii) thread-obliviousness, whereby the lock can be acquired by one thread and released by any other thread. More specifically, the top-level lock may be thread-oblivious and the second-level locks may have the property of cohort detection. In some embodiments, a hierarchical approach may be taken in building a NUMA-aware reader-writer lock. For example, in some embodiments, threads may contend on local structures (e.g., node-level or cluster-specific locks) to get permission to acquire a top-level (globally shared) reader-writer lock. In some such embodiments, writer threads may follow the lock cohorting strategy of handing off the lock to a local thread (i.e., one executing on the same NUMA node or in the same cluster of processor cores), whereas reader threads may follow an "all readers get in" strategy (in which all reader threads from all NUMA nodes can simultaneously acquire the lock in read-only mode). In other embodiments, only reader threads executing on a single NUMA node can simultaneously acquire the lock in read-only mode.

In some embodiments, to acquire the cohort lock, a thread must first acquire ownership of the lock assigned to its node and then acquire ownership of the top-level lock. After executing its critical section, the cohort lock owner may use the cohort detection property of its node-local lock to determine whether there are any local successors, and may hand off ownership of the local lock to a successor, if one exists. With this local lock hand off, the owner may also implicitly pass ownership of the top-level lock to that same successor. If the lock owner determines that there are no local successors then it may release the top-level lock. In some embodiments, the thread-obliviousness property of the top-level lock may come into play at this point. For example, ownership of the lock may initially be acquired by one thread executing on a given node, then implicitly circulated among several threads executing on that same node, and eventually released by some (possibly different) thread executing on that same node. To avoid starvation and provide long-term fairness, cohort lock implementations may place a bound on the number of back-to-back local lock transfers. For example, in some embodiments, an upper bound on the number of back-to-back local lock transfers may be set at 64, or at some other pre-determined (or configurable) value. In some embodiments, the cohort lock algorithm described herein may intentionally trade strict short-term FIFO/FCFS fairness for improved aggregate throughput. Specifically, some amount of unfairness (in which admission order deviates from arrival order) may be leveraged in order to reduce lock migrations and improve aggregate throughput of a set of contending threads. Unfairness, applied judiciously, and leveraged appropriately, may result in reduced coherence traffic and improved cache residency.

One goal of cohort locks is to reduce interconnect coherence traffic and coherence misses. In turn, the hit rate in the local cache may improve. In designing the example lock algorithms described herein, it was assumed that critical section invocations under the same lock are likely to exhibit reference similarity. In other words, it was assumed that acquiring a lock L may be a good predictor that the critical section protected by lock L will access data that was accessed by recent prior critical sections protected by lock L. Therefore, after a local hand off, data to be written by the next lock owner may be likely to be found in the owner's local cache, already in modified coherence state, as it may have been written by the prior lock owner. As such, the critical section may execute faster than if the prior owner resided on a different node. Cohort locks may provide benefit by reducing coherence traffic on both lock metadata and data protected by the locks. For example, if a cache line to be read is in modified state in some remote cache then it must currently be invalid or not present in the local cache. In that case, the cache line must be transferred to the local cache from the remote cache via the interconnect and downgraded to shared state in the remote cache. Similarly, if a cache line to be written is not already in modified state in the local cache, all remote copies of the cache line must be invalidated, and, if the line is not in shared state, the contents must be transferred to the cache of the writer thread. Note that read-read is the only form of sharing that does not require coherence communication. The locking techniques described herein are not as concerned with classic NUMA issues (such as the placement of memory relative to the location of threads that will access that memory) than with which caches shared data might reside in, and in what coherence states. In various embodiments of the locks described herein, cohort locking may work to reduce write invalidation and coherence misses satisfied from remote caches and may not specifically address remote capacity, conflict, and cold misses, which are also satisfied by transfers over the interconnect.

Note that a cohort locking transformation may be applied to many, if not most, types of existing locks, in different embodiments, including non-abortable locks (i.e., those that do not support timeouts), or abortable locks (i.e., timeout capable locks). A variety of approaches may also be taken for implementing the local structures of a NUMA-aware reader-writer lock, in different embodiments. For example, in various embodiments, local (e.g., node-specific) locks may include a spin-type lock, a ticket-based lock, a queue-based lock, a test-and-test-and-set lock, a back-off lock, or, in general, any other type of blocking or non-blocking lock, including a reader-writer lock. The choice of which approach will perform better for a given multithreaded application may be dependent on various characteristics of the system and/or the application (e.g., its aggregate workload and/or the distribution of accesses by the threads to a critical section(s) of code or shared resource(s) that are protected by the lock).

In some embodiments, the reader-writer locks described herein may include a cohort lock that uses classic ticket locks for the NUMA node-local locks and a partitioned ticket lock for the top-level lock. This lock may be referred to as the C-PTL-TKT lock, short for Partitioned-Ticket-Ticket cohort lock. In such embodiments, an "isLocked" interface (API) may allow reader threads to determine whether the write lock is held. This function may be implemented by comparing the request and grant indices of the top-level partitioned ticket lock. The C-PTL-TKT may be competitive with the best of the cohort locks, may avoid the node management overhead inherent in classic queue-based locks, but still provides local spinning. In some embodiments, the top-level and node-level locks implement FIFO ordering, although the resultant C-PTL-TKT lock does not necessarily implement FIFO ordering.

A Neutral-Preference Lock

In one embodiment of a neutral-preference NUMA-aware reader-writer lock, referred to herein as a C-RW-NP lock (Cohort; Read-Write; Neutral-Preference), the lock may attempt to ensure fairness between reader threads and writer threads (meaning that the reader threads or writer threads do not get any preferential treatment over the writer threads or reader threads, respectively). In this example, all threads (including reader threads and writer threads) may be "funneled" through a central cohort lock, such as that described above. The example high-level pseudo-code below depicts one embodiment of a C-RW-NP lock. In this example, each thread must first acquire the central CohortLock. For example, a reader thread uses the central lock to obtain permission to arrive at ReadIndr (example implementation details of which are described below), then immediately releases the lock, and proceeds to execute its critical section. The fact that reader threads execute their critical sections after releasing CohortLock may enable the potential for reader-reader concurrency.

After acquiring the cohort lock, a writer thread must ensure that there are no concurrent conflicting readers. As illustrated in this example, this may be done by spinning on ReadIndr (as shown on lines 9-10) waiting for any reader threads to depart. In some embodiments, this algorithm may ensure neutral preference since both the reader threads and the writer threads have to acquire the cohort lock. However, requiring reader threads to acquire the cohort lock may be detrimental to the scalability of C-RW-NP, and may also increase the latency of each read acquisition request. In some embodiments, the C-RW-NP lock may preserve some cache locality benefits for accesses to the lock metadata and the critical section protected by the lock because all operations funnel through the central cohort lock. Note that the C-RW-NP lock may not guarantee FIFO semantics. Rather, admission ordering may be determined by the prevailing policy imposed by the underlying CohortLock.

The pseudo-code below illustrates one example of a neutral-preference NUMA-aware reader-writer lock (C-RW-NP). In this example, lines 1-5 are executed by a reader thread and lines 8-12 are executed by a writer thread. For simplicity, the pseudo-code lists the entirety of lock acquisition, critical section execution, and lock release operations in sequential order. In their lock acquisition steps, both reader threads and writer threads acquire the cohort lock, while readers also arrive at the ReadIndr. In some embodiments, ReadIndr arrival and departure operations may be atomic operations.

```
1: reader:
2:     CohortLock.acquire( )
3:     ReadIndr.arrive( )
4:     CohortLock.release( )
5:     <read-critical-section>
6:     ReadIndr.depart( )
7: writer:
8:     CohortLock.acquire( )
9:     while NOT(ReadIndr.isEmpty( ))
10:        Pause
11:    <write-critical-section>
12:    CohortLock.release( )
```

A Reader-Preference Lock

As noted above, the C-RW-NP lock may, in some embodiments, suffer from a drawback arising from the requirement that readers are forced to acquire the central CohortLock. For example, acquiring the CohortLock may incur extra path length and overhead for read operations, even if the cohort lock itself is uncontended. Under load, contention on the central lock may result in extra coherence traffic and contention for available interconnect bandwidth, although this bottleneck may be mitigated to some degree by having chosen lock cohorting (which acts to reduce inter-node coherence traffic). Furthermore, the extra serialization related to the CohortLock critical section in the read path (albeit very brief) may in some embodiments constitute a scalability bottleneck. Finally, the algorithm's ordering of reader thread and writer thread requests based on the cohort lock acquisition order may restrict the achievable degree of reader-reader concurrency. In the worst case, there may be no reader-reader concurrency if reader threads and writer threads alternate in the cohort lock acquisition order. In some embodiments, these potential issues may be overcome in a NUMA-aware reader-writer lock that implements a reader-preference lock algorithm (referred to herein as a C-RW-RP lock).

In some embodiments, a NUMA-aware reader-writer lock may aggressively aggregate reader lock acquisition requests to maximize reader-reader concurrency for better scalability. This, however, may require the ability to allow newly arriving reader threads to bypass writer threads that arrived earlier but that are still waiting to acquire the lock. This observation has led to the development of some reader-writer locks that make this type of tradeoff between fairness and scalability, such as the example C-RW-RP lock illustrated by the pseudo-code below.

```
1: reader:
2:     while RBarrier != 0
3:         Pause
4:     ReadIndr.arrive( )
5:     while CohortLock.isLocked( )
6:         Pause
7:     <read-critical-section>
8:     ReadIndr.depart( )
9: writer:
10:    bRaised = false // local flag
11: start:
12:    CohortLock.acquire( )
13:    if NOT(ReadIndr.isEmpty( ))
14:        CohortLock.release( )
15:        while NOT(ReadIndr.isEmpty( ))
16:            Pause
17:            if RanOutOfPatience AND ~bRaised
18:                // erect barrier to stall readers
19:                atomically increment RBarrier
20:                bRaised = true
21:        goto start
22:    if bRaised
23:        atomically decrement RBarrier
24:    <write-critical-section>
25:    CohortLock.release( )
```

As illustrated in this example, reader threads and writer threads may interact with each other in a manner in which each first declares its existence to the other, and then checks for the status of the other. For example, in order to detect and resolve conflicts, reader threads may be visible to writer threads, and writer threads may be visible to reader threads and to other potential writer threads. In some embodiments, reader threads attempting to acquire the C-RW-RP lock for reading may not acquire the cohort lock. Instead, they may directly arrive at the ReadIndr of the lock (as shown on line 4). However, each reader thread may be able to make forward progress only when there are no "active" writer threads queued on the cohort lock (as shown on lines 5-6) Thereafter, reader threads may be able to execute their critical sections and release the lock by departing from ReadIndr (as shown on line 8).

As illustrated in this example, writer threads may first acquire CohortLock (as shown on line 12) and then verify that there are no concurrent "active" reader threads (as shown on line 13). If there are any concurrent reader threads (indicated by the ReadIndr), the writer thread may release the CohortLock (as shown on lines 13-14) and then wait for the readers to drain (as shown on line 15). Note that there may be a danger of starvation of the writer threads if they simply wait for no reader threads to be present but there is a steady stream of arriving reader threads. In some embodiments, in order to avoid this potential issue, a special reader barrier (called RBarrier) may be introduced that allow the writer thread to temporarily block all new reader threads from acquiring read ownership of C-RW-RP. For example, in lines 17-20 of the pseudo-code above, the writer thread raises the barrier (which is then lowered on line 23), and in lines 2-3, the new reader threads are blocked by the barrier. Note that, in some cases, there may be another pathology that allows reader threads to starve (e.g., in the case in which writer threads continuously keep raising the reader barrier and do not allow any reader threads to make forward progress). Because such a situation may be even rarer than the rare case in which a writer thread runs out of patience and raises the reader barrier, this potential issue may not be addressed, in some embodiments.

In some embodiments, the reader barrier described above may be implemented as a single central counter. In such embodiments, the writer thread may wait for a pre-determined amount of time before running out of patience (as shown on line 17). The patience threshold for the writer thread may be fairly long so that the reader barrier is rarely raised (and thus, it may not be expected to become a contention bottleneck). In some embodiments, the patience threshold may be a tunable parameter. For example, in some embodiments, the writer patience threshold may be set to 1000 iterations of the busy-wait loop, while in other embodiments, the writer patience threshold may be set to a different value or may be set dynamically (e.g., during runtime) in response to the workload or other conditions. As illustrated in this example, after the writer thread raises the reader barrier, the reader threads may steadily drain, then when all reader threads have departed, the writer thread may execute its critical section (as shown on line 24). Finally, the writer thread may relinquish write permission by simply releasing CohortLock (as shown as line 25).

In some embodiments, and for some workloads, the C-RW-RP lock described above may experience reduced performance due to an interaction between contending reader threads and writer threads and the succession policy of the Cohort-Lock. For example, in one execution scenario, writer threads w1, w2, w3 . . . , wn are queued on the cohort lock, and w1 is the lock owner, but it has not yet reached line 13 above. In this case, the isLocked function called on line 5 may return true, and may block all reader threads, in which case, if a multitude of reader threads arrive at that time, each of them will atomically increment ReadIndr, and then spin-wait for isLocked to return false. Next, w1 may execute line 13, detect that there are concurrent reader threads, and release the Cohort-Lock (as shown on line 14). In the process, w1 may hands off CohortLock to w2, which in turn hands off CohortLock to w3, and so on. All the while, CohortLock may remain in the locked state (even though the lock owner keeps changing) and isLocked may return true for all the reader threads spinning on it. This circulation of CohortLock ownership between the writer threads may lead to superfluous coherence activity on the lock metadata, as well as long and unnecessary waiting periods for reader threads, and this undesirable interaction between reader threads and writer threads may lead to significant performance degradation. Furthermore, this type of ownership circulation may void any ordering imposed between writer threads by the underlying CohortLock.

In some embodiments, in order to avoid this potential performance issue, a field (WActive) may be added to the C-RW-RP lock whose value reflects the logical state of the CohortLock. In such embodiments, the reader-writer conflict detection logic in line 5 of the pseudo-code for the C-RW-RP lock shown above may be modified to spin while WActive is true, instead of spinning on CohortLock. Meanwhile, for the writer threads, the pseudo-code for the C-RW-RP lock shown above between lines 11 and 21 may be replaced with the following pseudo-code.

```
CohortLock.acquire( )
loop:
    while NOT(ReadIndr.IsEmpty( ))
        if RanOutOfPatience AND ~bRaised
            // erect barrier to stall readers atomically increment
            RBarrier bRaised = true
    WActive = true // set flag for readers to spin
    if NOT(ReadIndr.IsEmpty( ))
        // there exist some active readers WActive = false // reset the flag
        goto loop
```

As illustrated in this alternate embodiment of the C-RW-RP lock, writer threads may acquire CohortLock in the usual fashion and then enter a loop. The code in the loop may first wait for ReadIndr to indicate that there are no pending or active readers, optionally erecting the reader barrier (RBarrier) if the writer thread becomes impatient. After ReadIndr indicates that there are no active reader threads, the code may set WActive to true, and then validate that there are no active or pending reader threads. If this is the case, then control may exit the loop and pass into the write critical section. If ReadIndr indicates the existence of reader threads, however, the code may set WActive to false and pass control back to the top of the loop, which again waits for extant reader threads to depart. In this example, the writer thread may continue to hold CohortLock while it waits for the reader threads to vacate, avoiding superfluous lock hand offs between writer threads. After completing its critical section, the writer thread may release the lock by setting WActive to false and then releasing CohortLock. In this example, reader threads may only be able to be blocked by a writer thread in the brief window in which the writer thread sets WActive and then resets it after detecting the pending reader threads. This form of the C-RW-RP lock may be referred to as the C-RW-RP-opt lock. Note that, in this example, WActive may only be modified under CohortLock, and may reflect the lock's state (e.g., true if CohortLock is acquired, and false otherwise). There may be no need for an analogous writer-preference "-opt" form of the NUMA-aware reader-writer lock, since reader threads can efficiently rescind publication of their intent to take read permission and then defer to pending writer threads.

A Writer-Preference Lock

Conventional wisdom may suggest that a reader-preference policy would perform better than both a writer-preference policy and a neutral-preference policy. For example, if an application developer has selected a reader-writer lock instead of a mutual exclusion lock for use in their application, it may be assumed (or expected) that the workload will be read-dominated. For an application workload that is read-dominated, one might naively implement a reader-writer lock policy that favors reader threads over writer threads, unless there was an extreme different between the length of the path for acquiring the reader-write lock in read-only mode and the path for acquiring the reader-writer lock in write mode (with the write path being much longer).

One might also naively expect a reader-writer lock policy that favored reader threads over writer threads to be superior to a reader-preference policy because the reader-preference policy would seem to allow the formation of larger R-groups (e.g., packing together as many reader threads as possible, which may, in general, lead to better reader-reader concurrency, and hence better throughput). In practice, however, it has been found that reader-writer locks that implement a reader-preference policy typically do not perform as well as writer-preference-based locks except in extreme cases in which there are almost no writer threads. In fact, assuming that a reader-writer lock is acquired by threads in read-only mode most of the time, a writer-preference policy may indirectly lead to the same result as a reader-preference policy (i.e., packing together a large numbers of reader requests). This is because preferential treatment of writer threads may lead to a build-up of pending reader requests, which are then granted en masse when all of the writer threads complete their critical sections. In some benchmarking experiments and in practice, it has been observed that reader-writer locks that employed a writer-preference policy actually admitted much more reader-reader parallelism and delivered better overall performance than did reader-writer locks that employed a reader-preference policy. However, the performance achieved for any particular execution of a multithreaded application running on a NUMA machine may be dependent on the particular system characteristics, as well as the characteristics of the application and its workload.

One example of a writer-preference NUMA-aware reader-writer lock is illustrated by the pseudo-code below. This example lock, which may be referred to as the C-RW-WP lock, is roughly symmetric to the C-RW-RP lock described above, except that the roles of reader threads and writer threads in their interactions are switched. As illustrated in this example, reader threads may arrive at the ReadIndr for the lock (as shown on line 4), check for a writer (as shown on line 5), and if there is one, may depart from the ReadIndr and wait for the writer threads to drain. If a reader thread runs out of patience (according to a tunable reader patience parameter that may be set to 1000 or some other pre-determined value), it may raise a writer barrier (as shown on line 10) to block new writer threads from acquiring CohortLock (as shown on lines 18-19). In this example, writer threads may first verify that the writer barrier has not been raised (as shown on lines 18-19), and then may acquire CohortLock (as shown on line 20) and ensure that there are no concurrent reader threads (as shown on lines 21-22) before executing the critical section.

```
 1:  reader:
 2:      bRaised = false // local flag
 3:  start:
 4:      ReadIndr.arrive( )
 5:      if CohortLock.isLocked( )
 6:          ReadIndr.depart( )
 7:          while CohortLock.isLocked( )
 8:              Pause
 9:              if RanOutOfPatience AND ~bRaised
10:                  atomically increment WBarrier
11:                  bRaised = true
12:          goto start
13:      if bRaised
14:          atomically decrement WBarrier
15:      <read-critical-section>
16:      ReadIndr.depart( )
17:  writer:
18:      while WBarrier != 0
```

-continued

```
19:          Pause
20:      CohortLock.acquire( )
21:      while NOT(ReadIndr.isEmpty( ))
22:          Pause
23:      <write-critical-section>
24:      CohortLock.release( )
```

Reader-Writer Lock Generalization

In some embodiments, the NUMA-aware reader-writer lock algorithms described herein may be are oblivious of the underlying read indicator (ReadIndr) and/or mutex lock (CohortLock) implementations from which they are constructed. These reader-writer locks may require only that the read indicator data structure provides the arrive, depart, and isEmpty operations described herein, and that the mutex lock provides the acquire, release, and isLocked operations. In general, any read indicators and mutex locks that support these operations may be used in these reader-writer algorithms, in different embodiments. It may be expected that many (if not most) implementations of read indicators and mutex locks can support all of these operations with minimal modification.

The design flexibility afforded by the NUMA-aware reader-writer lock algorithms described herein may provide programmers significant leverage to build reader-writer locks that are best suited for their applications. As described herein, NUMA-aware reader-writer locks may leverage NUMA-aware mutex locks and scalable read indicators, in some embodiments. In another example, a reader-writer lock may use distributed counters in the read indicator, and an MCS-style queue lock for writer-writer mutual exclusion. Such a lock may be appropriate for applications in which writing is exceptionally rare.

As previously noted, both strict reader-preference and strict writer-preference reader-writer lock policies may allow threads to starve in undesirable ways, particularly if threads are dedicated to certain roles. For example, under a writer-preference policy, reader threads may pass through the write lock of the reader-writer lock to ensure progress, or may erect a "barrier" to block the flow of new incoming writer threads, which may subsequently provide the reader threads an opportunity to run when all the extant writer threads (i.e. those that arrived before the barrier was erected) vacate. In a sense, these approaches may be thought of as transiently shifting the lock policy from a writer-preference policy to a reader-preference policy when reader threads are starving or languishing. In some embodiments, similar remedial actions may be applied to a basic reader-preference policy to ensure that writer threads are eventually able to run. In general, it may be the case that any viable general-purpose reader-writer lock may either need to alternate between a writer-preference policy and a reader-preference policy, or implement a reader-preference policy with writer remediation or a writer-preference policy with reader remediation. Again, one feature of a high-throughput reader-writer lock may be that it promotes reader-reader parallelism. That is, the lock algorithm may promote the formation of large R-groups. Another feature of a high-throughput reader-writer lock may be that it minimizes alternating from servicing reader threads to servicing writer thread or alternating from servicing writer threads to servicing reader threads.

Tracking Readers

As described herein, reader threads of a reader-writer lock may be tracked using any of a variety of read indicators.

However, writer threads checking for the existence of conflicting reader threads may not need an exact count of reader threads, but instead may only need to determine if there are any extant reader threads.

In some embodiments, the read indicator may be implemented as a simple counter, e.g., one that is updated atomically and that tracks the number of readers that are executing or that have indicated an intent to execute their respective critical sections. However, a simple counter may not scale on a NUMA system. As noted above, in some embodiments a SNZI-based solution may be employed for tracking reader threads in reader-writer locks. The SNZI-based solution may significantly scale the read indicator, but the resulting algorithm may be relatively complex and reader threads may incur significant overhead at low and moderate contention levels. As noted above, in some embodiments, the read indicator of a NUMA-aware reader-writer lock may include a logical counter that is "split" into multiple physical counters, e.g., one reader counter per NUMA node. This approach may result in a solution that has low latency at low to moderate read arrival rates and that scales well at high arrival rates.

As previously noted, in some embodiments, a reader thread may always manipulate its node-local reader counter. This may ensure that counter manipulations do not lead to inter-node coherence traffic. However, in such embodiments, after acquiring the internal cohort lock, a writer thread must peruse through all the node-local reader counters of the reader-writer lock to determine if it is safe to proceed executing the critical section, which may add overhead to the writer's execution path. In some embodiments, a trade-off may be made (based on the assumption that a reader-writer lock will be acquired in read-only mode most often) to simplify the execution path of reader threads (which involves an increment of just the node-local reader counter) at the cost of making the execution path of writer threads longer. Note that most multi-core multi-chip systems available today have a relatively small number of NUMA nodes (e.g., four). Thus, the overhead on the execution path of writer threads may not be a major performance concern on these systems. A different trade-off may be made if future NUMA systems include a larger numbers of nodes.

The decentralized split counter may itself be implemented in multiple ways, in different embodiments. In some embodiments, each node-specific counter may be an integer counter. In such embodiments, each reader thread may atomically increment the counter assigned to the reader thread's node during lock acquisition (arrival), and atomically decrement that same counter during lock release (departure). Using alignment and padding, each node-specific counter may be sequestered on its own cache line to avoid false sharing. In such embodiments, each writer, during lock acquisition, may verify that each node-specific counter is zero, and may spin-wait on any non-zero counter. This relatively simple split counter approach, though effective in reducing inter-node coherence traffic for reader threads, may still admit intra-node contention, in some cases.

In some embodiments intra-node contention may be reduced by employing a pair of counters (e.g., "ingress" and "egress" counters) in place of each node-specific counter. In such embodiments, a newly arriving reader thread may atomically increment the ingress counter during lock acquisition, and it may atomically increment the egress counter during lock release. When the values of the ingress counter and the egress counter are equal (in which case, the value of the node-specific counter is logically zero), this may indicate that there are no reader threads executing the related critical section of code. By splitting the logical node-level counter into two variables, contention arising from rapid intra-node arrival and departure of readers may be divided. On a given node, arriving threads may update the ingress counter independently of concurrently departing threads that are incrementing the egress counter. In some embodiments, each ingress-egress counter pair may be sequestered on a private cache line. This sequestration may in some embodiments reduce inter-node coherence traffic and false sharing. Using a split ingress-egress counter instead of single counter word may also reduce failures of intra-node compare-and-swap type operations. In some embodiments, the approach of using per-node counters or per-node split ingress-egress counters may outperform SNZI-based reader counters, at least on some platforms.

In embodiments that include these ingress-egress counter pairs, during lock acquisition, a writer thread may verify that the counters in each node-specific ingress-egress pair are equal. Note that this cannot be done atomically, and special care may need to be taken to avoid any races with concurrent reader threads that are manipulating the counters. More specifically, in the C-RW-WP algorithm described herein, the writer thread must first read the egress counter and then the ingress counter in order to correctly determine if the two are equal. In some embodiments, both of these counters may be monotonically increasing, and it may be guaranteed that the value of the egress counter is less than or equal to the value of the ingress counter at any given time.

Techniques for Waiting and Blocking

With any of the reader-writer locks described herein (including NUMA-aware reader-writer locks), it is possible that a thread will not be able to acquire the lock on its first attempt to do so. For example, if a thread wants to acquire the lock as a reader (i.e., in read-only mode) and a writer thread already holds the lock (in write mode), then the acquiring reader thread will not be able to acquire the lock right away. Instead, the acquiring reader thread may need to wait for the writer thread to release the lock. Similarly, if a thread wants to acquire the lock as a writer (i.e., in write mode) and another writer thread or one or more reader threads already hold the lock, then the acquiring writer thread may have to wait for the lock to be free. As described above, in some embodiments, if a thread is not able to acquire the reader-writer lock because an existing writer or existing reader(s) already hold the lock, the acquiring thread may spin until the lock is free. In such embodiments, each such acquiring thread will consume CPU resources while spinning, which may cause elevated CPU usage in the system.

In some embodiments of the reader-writer locks described herein (including NUMA-aware reader-writer locks), if a thread is not able to acquire the reader-writer lock because the lock is already held by an existing writer or existing reader(s), the acquiring thread may go to sleep (or be put to sleep) until the lock is freed, at which point the exiting thread (e.g., the thread that is releasing the lock) may wake-up one or more threads that were blocked (sleeping) on the lock or on one of its components.

In some embodiments, putting a thread that is not able to acquire the lock to sleep may include putting the thread into a sleep state in which it does not consume any processor resources (or in which it consumes very few processor resources). For example, in various embodiments, putting a thread to sleep may include placing an identifier of the thread on a turnstile sleep queue (or another type of sleep queue or similar structure), setting an indicator of the thread's state to "sleep" (in which case it will not be dispatched for further execution) and/or placing a processor core on which thread is executing in a state in which at least some of the circuitry of the processor may be powered down.

In some embodiments, waking a thread that has been put to sleep may include searching a turnstile sleep queue (or another type of sleep queue or similar structure) on which an identifier of the thread was placed in order to select the thread that is to be woken up (according to any of a variety of priority policies), changing an indicator of the thread's state to indicate that it is runnable (e.g., so that it can be dispatched for resumed execution and can again attempt to acquire the lock) and/or fully powering up the processor core on which the thread is executing. In some embodiments, both putting a thread to sleep and waking it back up may include obtaining a lock on the sleep queue (or similar structure) prior to modifying its contents (e.g., adding or removing a thread identifier or changing an indication of its state) and releasing the lock after modifying its contents.

Note that in some cases, blocking (by sleeping) and then waking up may be relatively costly in terms of time spent, since these operations may involve placing a thread in a sleep queue while sleeping and performing a search of one or more sleep queues in order to wake-up the appropriate thread(s). For example, if the critical sections protected by a reader-writer lock are small, the cost of putting a thread to sleep and then waking it up may be much higher than the cost of the thread executing in its critical section.

Delayed Sleep

In various embodiments, when a reader thread tries to acquire a reader-writer lock (e.g., a NUMA-aware reader-writer lock) and another thread has already acquired the lock as a writer, the reader thread may proceed in one of two ways. For example, in some embodiments, the reader thread may spin-wait for the writer thread to release the lock, while in other embodiments, the reader thread may go to sleep until the writer thread wakes it up while exiting (releasing) the lock. Similarly, in some embodiments, if a writer thread is trying to acquire a reader-writer lock (e.g., a NUMA-aware reader-writer lock) and there are existing reader threads, the writer thread may spin-wait until all reader threads have released the lock, while in other embodiments, the writer thread may go to sleep until the last exiting reader wakes it up while exiting (releasing) the lock.

As noted above, in embodiments in which acquiring threads block (sleep) may be very costly because the threads may need to be stopped and put in appropriate sleep queues. In addition, if a thread is sleeping, then at some point it may need to be woken up (which may involve a costly search for the appropriate thread in a sleep queue before it can be woken up). As noted above, it may often be the case that workload critical sections are small and the total time spent going to sleep, sleeping, and waking up may surpass the total time spent in the associated critical section. On the other hand, in implementations in which threads spin while waiting for an opportunity to acquire a lock (e.g., using a spin-wait loop or a similar mechanism), the acquiring threads may consume multiple (many) CPU cycles just spinning and otherwise doing nothing. This waste of CPU resources may become even worse in the case that the critical sections protected by the lock are larger.

In some embodiments, in order to overcome this potential issue, the reader-writer locks described herein (e.g., NUMA-aware reader-writer locks) may employ a delayed sleeping mechanism. In such embodiments, when a reader thread or a writer thread is not able to acquire the lock on its first attempt to do so, it may spin for some pre-determined amount of time and then try again to acquire the lock. However, if (after that time) the acquiring thread is still not able to acquire the lock, the acquiring thread may go to sleep (or be put to sleep). In other words, rather than blocking immediately following a first failed attempt to acquire the lock, an acquiring thread may first spin for a pre-determined amount of time in the hope that the lock will soon be released. If the lock is not released during that time, the acquiring thread may block on the lock or one of its components. In some embodiments, more than one such spin period (each followed by an additional attempt to acquire the lock) may be employed before resorting to blocking on the lock.

In some embodiments, the amount of time for which an acquiring thread will spin before making another attempt to acquire the lock and/or going to sleep may be chosen based on the total amount of time that it would (or will) take for the acquiring thread to be put to sleep and to be awakened in a typical (e.g., observed or expected) workload and/or based on the total amount of time that it would (or will) take for the current lock holder to execute its critical section and release the lock in a typical (e.g., observed or expected) workload. In some embodiments, the spin period (sometimes referred to herein as the patience value) may be static (e.g., hard-coded in the application) based on the results of a benchmarking operation. In other embodiments, it may be configurable at compile time (e.g., based on a previously observed or expected workload) or may be dynamically configurable at runtime (e.g., in response to the actual workload). By employing this delayed sleeping approach, the cost of the acquiring thread sleeping and waking up may be avoided in cases in which the critical section being executed by the current lock holder is small enough that the cost of the acquiring thread sleeping and waking up would surpass the cost of spinning while waiting for the current lock holder to execute its critical section and release the lock. Note that a reader patience threshold value may or may not be same as a writer patience value for the same lock, in different embodiments.

Early Wake-Up

As described herein, when a thread that wishes to acquire a lock but is not able to (e.g., if the thread does not attempt to acquire the lock or if an attempt to acquire the lock fails) and the thread goes to sleep, the thread will eventually need to be woken up. In some embodiments of the reader-writer locks described herein, if the lock is held by a writer thread and both reader threads and writer threads are sleeping (blocking), when the writer thread that holds the lock releases the lock, all pending (sleeping) reader threads are woken up and may acquire the lock for reading. Subsequently, when the last of these reader thread exits the lock, it may wake up one of the waiting (sleeping) writer thread. In such embodiments, there may be two separate wake-up operations, and these wake-up operations happen at different times. In the first wake-up operation, reader threads are woken up. Later, in a second wake-up operation, a writer thread is woken up. As noted above, waking up threads may include searching a sleep queue to identify the appropriate thread(s) to wake up and may also include acquiring a mutex lock in order to perform the search, performing two separate wake-up operations may be costly (in terms of time spent).

In some embodiments, rather than performing two separate wake-up operations to wake up sleeping reader threads and a sleeping writer thread, a reader-writer lock may employ an early wake-up mechanism. In embodiments that employ this mechanism, when a writer thread that holds a reader-writer lock exits, it wakes up all eligible readers and also one eligible writer (e.g., at approximately the same time, as part of releasing the lock). In some embodiments, a writer thread that is woken up early in this way may often be able to acquire the lock without the need to go to sleep again. For example, this early wake-up mechanism may, in some embodiments, save the cost of acquiring and releasing the mutex on the sleep queue to search for an appropriate writer thread to wake up, since this search may be performed while the reader threads that were woken up execute their critical sections. In some embodiments, when used in conjunction with the delayed sleep mechanism described above, the writer thread that is woken up early may spin for a pre-determined amount of time during which all of the reader threads that were woken up may finish executing their critical sections (e.g., in parallel, in some cases) and release the lock, at which point the writer thread that was woken up early may acquire the lock without going back to sleep again first.

Adaptive Sleep

As previously noted, when a reader or writer thread wishes to acquire a reader-writer lock but the lock is already held by another writer thread, the acquiring writer or reader thread may go to sleep. In some embodiments, the delayed sleep approach described above may be employed, and may (under certain circumstances) allow the cost of the acquiring thread going to sleep and being woken up to be avoided. In other embodiments, an adaptive sleep strategy may be employed that predicts the time that will be needed for the writer thread that is currently holding the lock to release it.

For example, if the reader-writer lock is currently held by a writer thread (e.g., in write mode), and the writer thread that holds the lock is currently executing on a processor in the system, then it may be very probable that writer thread holding the lock will finish up the job soon (e.g., will finish executing its critical section and release the lock). In this case, it may be appropriate to employ the delayed sleep strategy described above. However, if the writer thread that holds the lock is not currently executing on any processor in the system (e.g., if it has acquired the lock for writing but has not yet entered its critical section because it is waiting for reader threads to drain or for some other reason), then it may be very probable that it will take more time for the writer thread holding the lock to finish executing its critical section and release the lock. In this case, the delayed sleep strategy described above may not provide any benefit, since the writer thread holding the lock may be likely to hold the lock long enough to cause all waiting threads go to sleep anyway (e.g., after spinning for a short period of time). Therefore, in some embodiments, rather than spinning for a short period of time before attempting to acquire the lock and then having to go to sleep anyway, acquiring threads that determine that a writer thread holding the lock is not currently executing on a processor in the system may go to sleep without first employing the delayed sleep strategy described above. In some embodiments structures within each of the processor cores may store an identifier of the thread current executing on the processor core. In such embodiments, determining whether a thread that holds the lock is currently executing on a processor may include examining each of these structures (e.g., examining each processor code in the system, if necessary) and comparing these identifiers with an identifier of the lock holder that is stored in the lock structure itself to see if there is a match.

In some embodiments, this adaptive sleep strategy, when combined with the delayed sleep approach and/or the early wake-up mechanism described above, may provide an efficient and cost-effective sleeping-waking up mechanism for reader-writer locks, including NUMA-aware reader-writer locks. In general, the use of one or more of these techniques (early wake-up, delayed sleep, and adaptive sleep) may result in more efficient sleeping and waking up mechanisms for reader-writer lock synchronization primitives by reducing the total amount of time spent in acquiring and releasing these locks.

One embodiment of a method for implementing a scalable, adaptive reader-writer lock that employs one or more of the techniques described above is illustrated by the flow diagram in FIG. 3. As illustrated at 310, in this example, the method may include a thread attempting to acquire a reader-writer lock that protects a critical section of code or shared resource. If the lock is not already held by a writer thread (shown as the negative exit from 320), the method may include the thread acquiring the lock for reading or writing (as in 355). If the lock is already held by a writer thread (shown as the positive exit from 320), but the lock holder is not yet executing on a processor (or processor core) in the system (shown as the negative exit from 330), the method may include putting the acquiring thread to sleep (as in 360).

On the other hand, if the lock holder is executing on one of the processors (or processor cores) in the system, shown as the positive exit from 330, the method may include the thread spinning for a pre-determined amount of time, after which it may attempt to acquire the reader-writer lock, as in 340. In other words, the method may employ a delayed sleep approach. If, after spinning for the pre-determined amount of time, the lock is no longer held by the writer thread (shown as the negative exit from 350), the method may include the thread acquiring the lock for reading or writing, (as in 355).

If, after spinning for the pre-determined amount of time, the reader-writer lock is still held by the writer thread (shown as the positive exit from 350), the method may include putting the thread to sleep (as in 360), as described above. While the lock is held by the writer thread (shown as the feedback from the negative exit of 370 to its input), the acquiring thread may continue to sleep. Note that while sleeping, the acquiring thread may not test the lock to determine whether it is still held. Rather, the acquiring thread may sleep (expending few, if any, processor resources) until a pre-defined condition is met, as determined by the lock or lock holder (e.g., by a method of the lock structure or another process) and the acquiring thread is woken up (e.g., by the lock holder), as described above.

Figure 3:
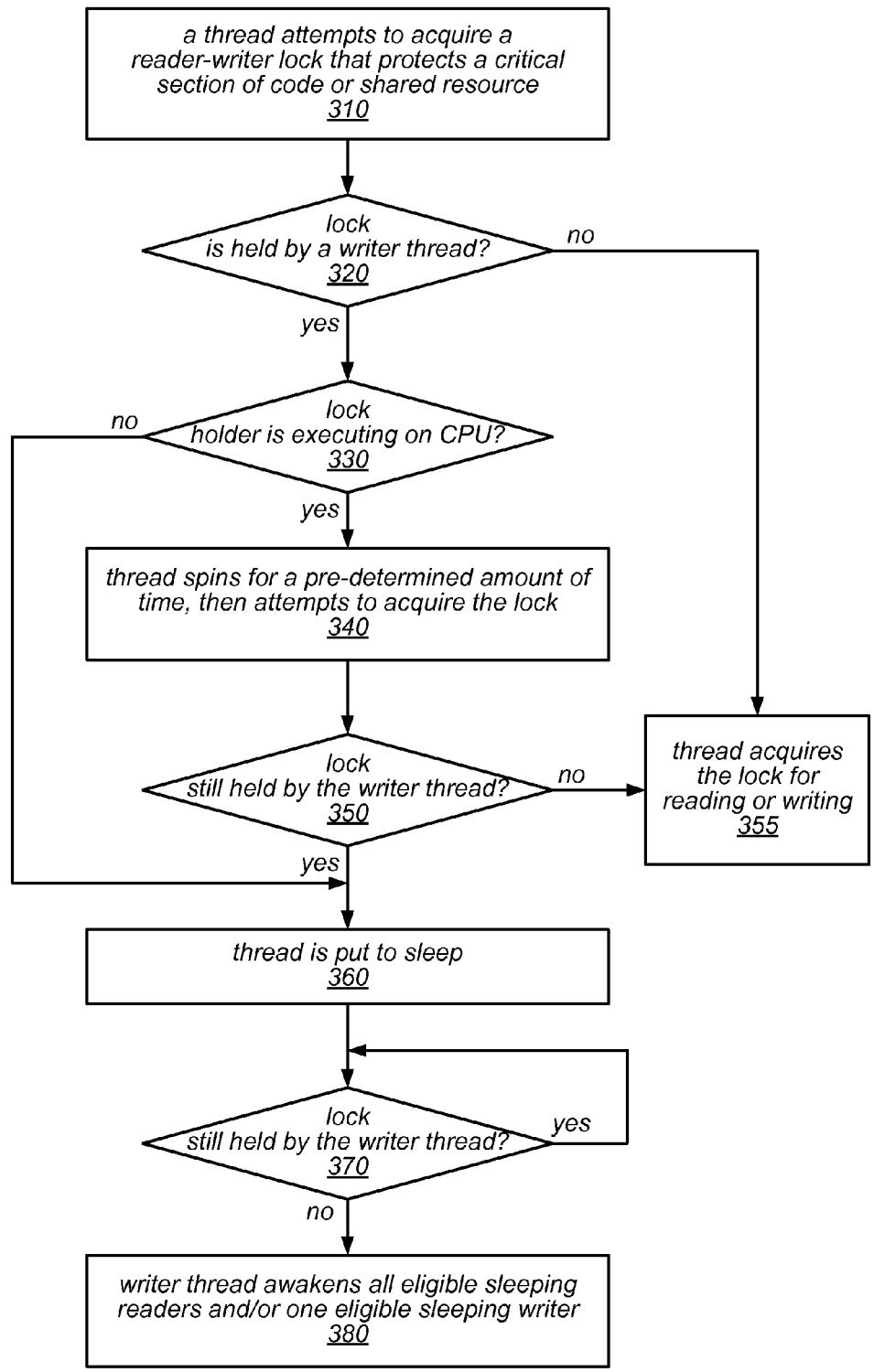
FIG. 3 is a flow diagram illustrating one embodiment of a method for implementing a scalable, adaptive reader-writer lock, as described herein.

As illustrated in this example, once the writer thread is finished executing a critical section associated with the reader-writer lock and is ready to release it, the method may include (as part of the process of releasing the lock) the writer thread waking all eligible sleeping reader threads (if any) and/or one eligible sleeping writer (e.g., in some embodiments. This is illustrated in FIG. 3 by the negative exit from 370 and element 380. For example, if there are one or more sleeping readers, the method may include the writer thread waking the readers and also waking the next eligible writer (e.g., without waiting for the readers to complete execution of their critical sections). If there are no sleeping readers, the method may include the writer thread waking only the next eligible writer.

Some reader-writer locks (including those that are not NUMA-aware, i.e., those that do not take advantage of NUMA awareness) may employ a single eight-byte (or four-byte) variable to track both readers and writers. If multiple reader threads that are scheduled for execution on the processors (CPUs) of different NUMA nodes are attempting to acquire such a lock at the same time, they all will try to increment the same counter. This can generate a lot of inter-node traffic and degrade performance. In some embodiments, a NUMA-aware reader-writer lock, such as the example NUMA-aware reader-writer lock described below, may overcome these limitations by distributing the contention point. As is the case in some of the reader-writer locks described above, the example NUMA-aware reader-writer lock described below includes one read indicator per NUMA node (which may allow it to avoid inter-node traffic for read operations) uses an adaptive mutex lock to maintain mutual exclusion for writers.

In some embodiments, a NUMA-aware reader-writer lock structure may include a lock type field, a write mutex field, and an active writer field (e.g., in a header portion of the lock structure), along with a distributed reader counter. In this example embodiment, the lock type field may indicate that the lock is of one of two types: a default lock type (in which the lock does not include support for reader re-entrancy or in which such support is disabled), and a reader re-entrant lock type (in which the lock includes support for reader re-entrancy and that support is enabled).

Note that, in some embodiments of reader-writer locks that do not support reader re-entrancy, if a reader thread that already holds the lock (in read-only mode) attempts to acquire the lock again (without first releasing the lock), the lock may produce and/or return an indication of an error condition, and may not allow the reader thread to enter a critical section or access a shared resource that is protected by the lock. In such embodiments, if the lock does not support reader re-entrancy, then it may be considered a programming error for any thread to acquire the lock if it already holds the lock, even as a reader thread, as doing so can potentially result in a deadlock in the system. For example, if reader thread acquires the lock (in read-only mode), and then a writer thread tries to acquire the lock (in write mode), the writer thread may block. Subsequently, if the reader thread tries to acquire the lock again (in read-only mode), it may need to wait till the writer thread acquires (and then releases) the write lock. However, the writer thread may not be able to execute its critical section until the reader thread releases the lock. Thus the reader and writer threads deadlock. In some embodiments, a "debug" version of the NUMA-aware reader-writer lock structure may be able to detect such deadlocks. An example of one such debug version is described in more detail below.

In some embodiments, a particular instance of this example NUMA-aware reader-writer lock structure may provide reader re-entrancy if, when the lock is initialized, it is designated (e.g., by the value of this field) as having a reader re-entrant lock type. As described in more detail below, this feature may allow reader threads that have already obtained a NUMA-aware reader-writer lock (in read-only mode) to re-enter the lock as a reader thread again (without first releasing the lock) even if there are waiting writer threads. Note that this feature of the NUMA-aware reader-writer lock may be useful in situations in which, at a particular point in the code, it may not be known whether the reader-writer lock has already been acquired by the reader thread. For example, in some embodiments, reader threads that wish to execute a critical section associated with a NUMA-aware reader-writer lock (one that supports reader re-entrancy) but that do not know whether they already hold the lock may call a method of the NUMA-aware reader-writer lock to attempt to acquire the lock. If the thread already holds the lock, it may enter the critical section (without an error condition being produced or returned). If the thread has not already acquired the lock for reading, it may yield to waiting writer threads, if any exist. Note that in some embodiments of the reader re-entrant version of the example NUMA-aware reader-writer lock structure described herein, an attempt to acquire the lock for reading when the reader thread already holds the lock may only be able to succeed if the lock is held only once (so far) by the reader thread (i.e., the reader thread has only acquired the reader lock once without yet releasing it).

Note that in some embodiments, the example NUMA-aware reader-writer lock structure described herein may not allow re-entrant writer threads, nor allow a re-entrant mix of reader threads and writer threads. In other words, they may not allow an acquiring thread (e.g., a caller) that has already obtained a lock in read-only mode to be able to acquire the lock in write mode without first releasing all read locks, and vice versa.

In some embodiments, the write mutex of the NUMA-aware reader-writer lock structure may maintain mutual exclusion for writer threads. For example, when a writer thread wants to acquire the lock it may first acquire this mutex (indicating an intent to execute a critical section or access a shared resource associated with the lock in write mode) and then may wait for any existing reader threads to finish executing their critical sections (or accessing any shared resources that are associated with the lock) before actually taking the lock and acting as a lock holder (e.g., executing a critical section or accessing a shared resource associated with the lock in write mode). A reader thread may not acquire the write mutex but may check to see if the mutex is free (i.e., it may check this field to verify that the lock is not held already by a writer thread) before it enters the lock as a reader thread.

In some embodiments, the value of the active writer field of the NUMA-aware reader-writer lock structure may indicate whether or not the lock is actually held by a writer thread. For example, in some embodiments, this field may contain an address or other identifier of a writer thread that has actually taken the lock in write mode. Note that this should not be confused with the write mutex field described above, which indicates only that a writer thread wants to hold the lock as a writer and not whether it has taken actually the lock in write mode.

In some embodiments, the NUMA-aware reader-writer lock structure may also include (e.g., in the header portion of the lock structure) a field whose value indicates the total size of the NUMA-aware reader-writer lock structure and/or a field whose value indicates the total number of NUMA nodes in the system.

As noted above, the NUMA-aware reader-writer lock structure may also include a reader counter, which may be implemented as a distributed split read indicator, such as those described above. For example, in some embodiments of the NUMA-aware reader-writer lock structure, each NUMA node may have its own read indicator (which may be implemented as an ingress-egress counter pair) and threads executing on a particular NUMA node may update the read indicator that is local to its NUMA node The following pseudo-code illustrates an example node-local read indicator structure for a single NUMA node, according to one embodiment.

```
typedef struct _rwnuma_reader {
    volatile ulong_t   rd_in;
    char    pad_in[(FALSE_SHARING_ALIGN >> 1) - (sizeof (ulong_t))];
    volatile ulong_t   rd_out;
    char    pad_out[(FALSE_SHARING_ALIGN >> 1) - (sizeof (ulong_t))];
} rwnuma_reader_t;
```

As shown in this example, padding may be added following the ingress and egress counters to align them with cache line boundaries, which may improve performance by reducing false sharing on cache lines. For example, if the system includes a 32-byte L1 or L2 cache and a 64-byte L3 cache, using a split counter may result better performance than using a single increment-decrement counter, as the ingress and egress counters for a given NUMA node may reside on different L1 and L2 cache lines. In this example, when a reader thread acquires the lock, it may increment the value of the ingress counter (rd_in) by 1, and when it releases the lock, it may increment the egress counter (rd_out) by 1. Note that because a thread can migrate from a particular NUMA node's CPU to another NUMA node's CPU, it may be possible that a thread increments the ingress counter (rd_in) of the node-local read indicator structure for one NUMA node when acquiring the lock and increments the egress counter (rd_out) of the node-local read indicator structure for another NUMA node when releasing the lock.

In this example, the total number of active reader threads for a lock may be equal to the sum of the values of the ingress counters (rd_in) for all NUMA nodes less the sum of the values of the egress counters (rd_out) for all NUMA nodes. As shown in the example pseudo-code above, the addition of padding in the node-local read indicator structures may in some embodiments ensure sure that each of the ingress-egress counter-pairs (corresponding to a respective NUMA node) occupies one 64-byte L3 cache line.

In some embodiments, when an instance of the NUMA-aware reader-writer lock structure is initialized, it may call a function that returns the maximum number of nodes in the system and may allocate memory based on that information. In such embodiments, each time a thread touches its node-local read indicator, it may first obtain an identifier of the node on which it is executing (e.g., through a function call that returns this information), and then update the corresponding node-local read indicator.

Figure 4A:
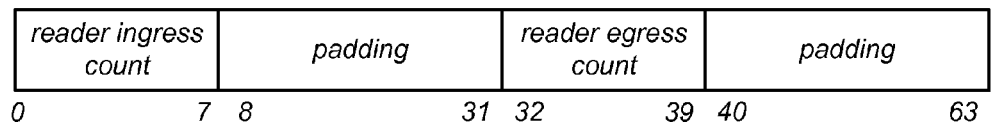
FIG. 4A is a block diagram illustrating one embodiment of a reader counter.

One embodiment of a reader counter for a particular node is illustrated by the block diagram in FIG. 4A. In this example, it is assumed that the node-local reader counter is implemented on a machine having 64-byte cache lines. As illustrated in FIG. 4A, the reader counter may include a reader ingress counter (e.g., in bytes 0-8), padding for alignment purposes (e.g., in bytes 8-31), a reader egress counter (e.g., in bytes 32-39), and more padding for alignment purposes (e.g., in bytes 40-63).

The following pseudo-code illustrates an example header for a NUMA-aware reader-writer lock structure (e.g., one that includes the header information described above), according to one embodiment. Note that this example pseudo-code includes additional fields that may be included in the header if the lock structure is instantiated in a debug mode.

```
typedef struct _rwnuma_hdr {
    uint32_t    rwnh_type;              /* reader-writer lock type */
    uint32_t    rwnh_rwnuma_node_count; /* number of nodes */
    volatile    uintptr_t rwnh_wr_active; /* writer thread address */
    size_t      rwnh_rwnuma_size;       /* size of lock structure */
                                        /* allocation */
    kmutex_t    rwnh_wr_mutex;          /* writer mutex */
#ifdef DEBUG
    kmutex_t    rwnh_rd_mutex;          /* reader list mutex */
    group_t     *rwnh_rd_active;        /* reader list */
#endif /* DEBUG */
} rwnuma_hdr_t;
```

Figure 4B:
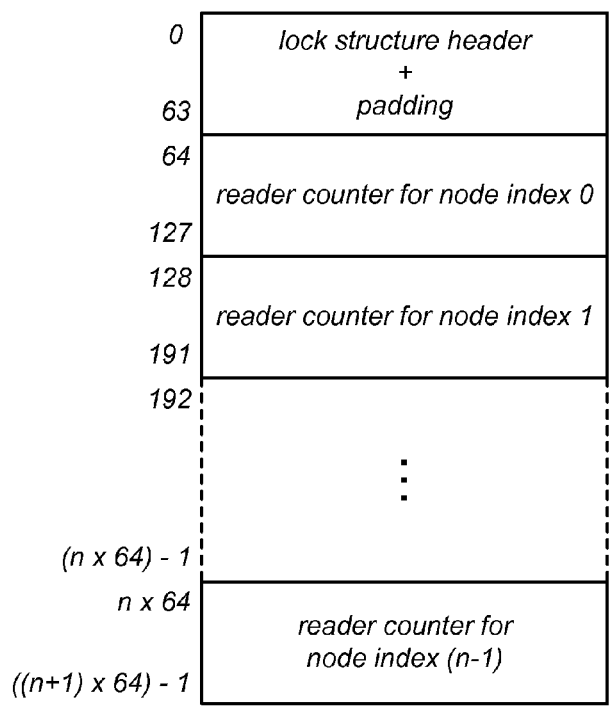
FIG. 4B is a block diagram illustrating one embodiment of a reader-writer lock structure.

One embodiment of a NUMA-aware reader-writer lock structure (e.g., one that includes the header and distributed reader counter described above) is illustrated by the block diagram in FIG. 4B. In this example, it is assumed that the reader-writer lock structure is implemented on a machine having 64-byte cache lines, and that the NUMA-aware reader-writer lock structure is always cache aligned. As illustrated in FIG. 4B, the reader-writer lock structure may include the lock structure header and padding in a first 64-byte element, and may include a respective 64-byte reader counter for each node (e.g., for each of n nodes, indexed 0 to (n−1)) in the system. In some embodiments, each of these reader counters may take the form of the node-local reader counter illustrated in FIG. 4A.

The following pseudo-code illustrates an example NUMA-aware reader-writer lock structure (e.g., one that includes the header information and distributed reader counter described above), according to one embodiment. As illustrated in this example, the lock structure includes enough padding between the header and an array of node-local reader counters to align the start of the first of n node-local reader counters on a 64-byte cache line (wherein n represents the number of NUMA nodes for which the lock structure includes a node-local reader counter).

```
typedef struct _krwnumalock_t {
    rwnuma_hdr_t    rwnuma_hdr;
    char    rwnuma_pad[FALSE_SHARING_ALIGN - sizeof (rwnuma_hdr_t)];
    rwnuma_reader_t    rwnuma_reader[n];
} krwnumalock_t;
```

In some embodiments, early wake-up, delayed sleep, and/or adaptive sleep techniques may be employed in the NUMA-aware reader-writer locks described above. Examples of the application of these techniques in these NUMA-aware reader-writer locks are described in the flow diagrams illustrated in FIGS. 5-8, according to various embodiments.

As previously described, in some embodiments, if a reader thread cannot acquire a NUMA-aware reader-writer lock because the lock is currently held by a writer thread or is wanted by a writer thread, the reader thread may spin (under certain circumstances). However, because the cost of sleeping (e.g., on a turnstile sleep queue or similar) and then waking up may be very high, a delayed sleep approach may be employed, as described above. In some embodiments, many (if not most) reader threads that employ this approach may be able to acquire the lock before running out of patience (and without having to go to sleep), which may result in better performance overall. In some embodiments, the maximum period of time for which a reader may spin before going to sleep may be bounded to avoid having large numbers of reader threads (e.g., many hundreds or thousands of reader threads, in some cases) spinning and waiting for a writer thread to exit the lock (e.g., if the critical section being executed by the writer thread is very long), which may result in high CPU usage. In some embodiments, a reader thread may spin (as in the delayed sleep approach) only if a writer thread that holds the lock is currently executing on a processor in the system and a patience value has not expired. Otherwise (e.g., if a writer thread that has indicated an intent to acquire the lock goes to sleeps or is put on a run queue, or has not yet begun executing) the reader thread may go to sleep without first spinning. In some embodiments, the patience value may be calculated based, at least in part, on the total time that it would take for a thread to go to sleep and then wake up in a normal workload. For example, it may be based on (or may be a multiple of) the typical, average, minimum or maximum amount of time that it takes to put a thread into a sleep state, and/or the typical, average, minimum or maximum amount of time that it takes to wake a thread that was previously put in a sleep state. For example, the patience value may be static (e.g., hard-coded in the application) based on the results of a benchmarking operation. In other embodiments, it may be configurable at compile time (e.g., based on a previously observed or expected workload) or may be dynamically configurable at runtime (e.g., in response to the actual workload).

Figure 5:
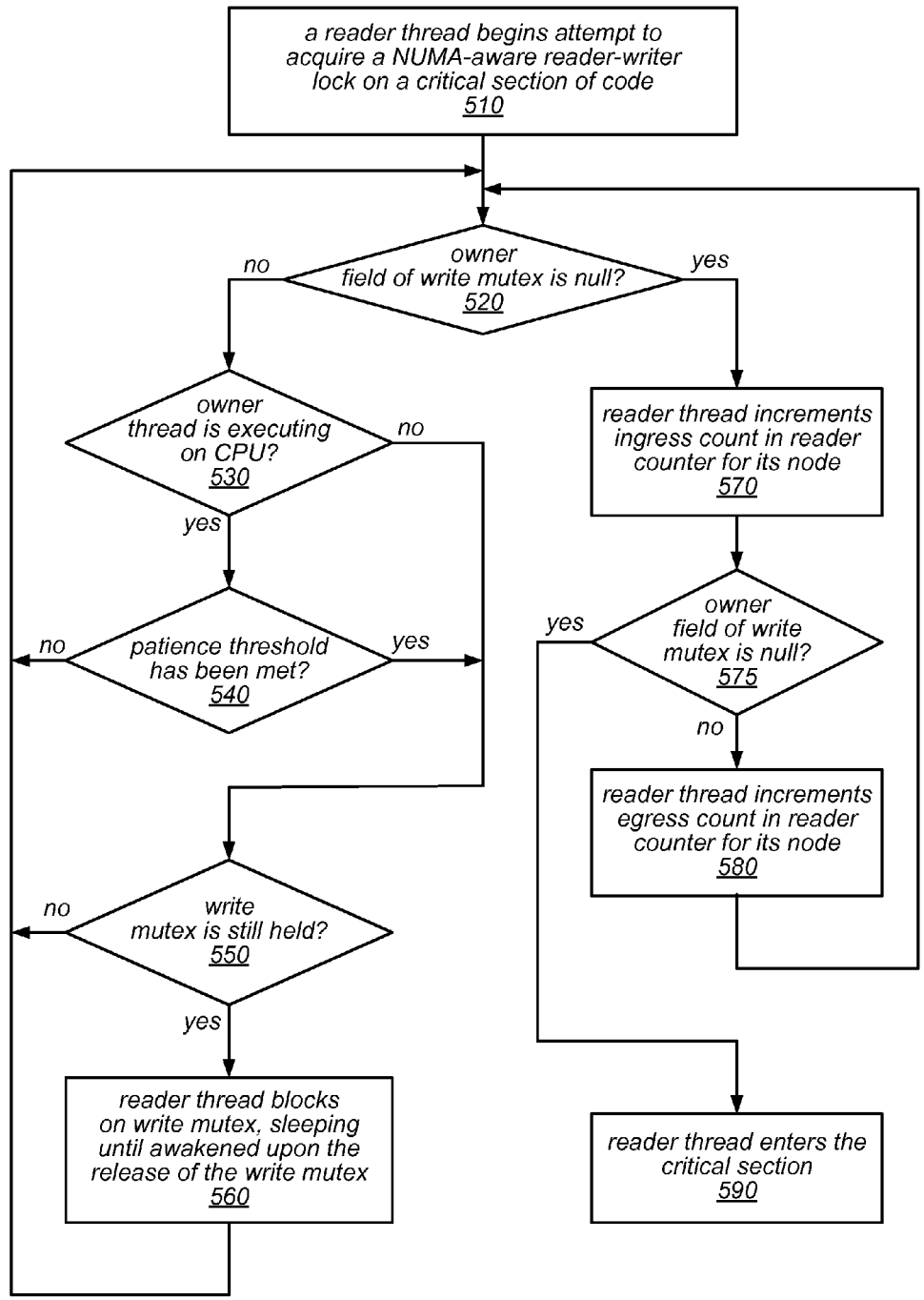
FIG. 5 is a flow diagram illustrating one embodiment of a method for a reader thread to acquire a NUMA-aware reader-writer lock, as described herein.

One embodiment of a method for a reader thread to acquire a NUMA-aware reader-writer lock is illustrated by the flow diagram in FIG. 5. As illustrated at 510, in this example, the method may include a reader thread beginning an attempt to acquire a NUMA-aware reader-writer lock on a critical section of code for reading. If the value of the owner field of the write mutex portion of the reader-writer lock is null, indicating that no thread currently holds, or intends to acquire, the lock for writing (shown as the positive exit from 520), the method may include the reader thread incrementing an ingress count in the reader counter for its node (as in 570), and then determining if the value of the owner field of the write mutex is still null (as in 575). If so (shown as the positive exit from 575), the method may include entering the critical section (as in 590). However, if it is determined that the value of the owner field of the write mutex is no longer null (shown as the negative exit from 575), the method may include the reader thread incrementing an egress count in the reader counter for its node (as in 580), and repeating the operations illustrated in FIG. 5 (beginning at element 520) in a continuing attempt to acquire the reader-writer lock.

If the owner field of the write mutex is not null (i.e., if a writer thread has already acquired the lock for writing or indicated an intent to acquire the lock by writing to this field), the method may include the acquiring reader thread determining whether the owner thread (a writer thread) is currently executing on a processor in the system. This is illustrated in FIG. 5 by the negative exit from 520 and element 530. If the owner thread is not currently executing on one of the processors in the system (shown as the negative exit from 530), the method may include determining whether the write mutex is still held (as in 550). If so (shown as the positive exit from 550), the method may include the acquiring reader thread blocking on the write mutex (e.g., going to sleep or being put to sleep), and sleeping until it is woken up upon the release of the write mutex, as in 560. After the acquiring reader thread has been awakened, the method may include repeating the operations illustrated in FIG. 5 (beginning at element 520) in a continuing attempt to acquire the reader-writer lock. For example, if (after the acquiring reader thread has been awakened), the owner field of the write mutex is null (shown as the positive exit from 520), the method may continue at 570, with the reader thread incrementing the ingress count in the reader counter for its node (as in 570), checking the owner field again (as in 575), and (if the owner field is still null) entering the critical section (as in 590). In this example, if the owner thread is not currently executing on one of the processors in the system (shown as the negative exit from 530), but the write mutex is no longer held (shown as the negative exit from 550), the method may include repeating the operations illustrated in FIG. 5 (beginning at element 520) in a continuing attempt to acquire the reader-writer lock (which may now be available to be acquired).

On the other hand, if the owner field of the write mutex is not null (i.e., if a writer has already acquired the lock for writing or indicated an intent to acquire the lock by writing to this field, shown as the negative exit from 520), and the owner thread is currently executing on one of the processors in the system (shown as the positive exit from 530), the method may include the acquiring reader thread spinning until the write mutex is no longer held, until the owner thread is no longer executing on a processor in the system, or until a patience threshold is met. This delayed sleep approach is illustrated in FIG. 5 by the feedback path from the positive exit of 530 to 540 and from the negative exit of 540 to 520, and by the feedback path from the positive exit of 540 to 550 and from the negative exit of 550 to the input of 520. Until one or more of these conditions is met, the method may include repeating the operations illustrated in FIG. 5 (beginning at element 520) in a continuing attempt to acquire the reader-writer lock. As previously noted, in some embodiments, the patience value may be calculated based, at least in part, on the total time that it would take for a thread to go to sleep and then wake up in a normal workload.

As illustrated in this example, if the owner field of the write mutex is not null (shown as the negative exit from 520), and the owner thread is currently executing on one of the processors in the system (shown as the positive exit from 530), but the patience threshold has been met (i.e., once the patience threshold has been met) the method may include determining whether the write mutex is still being held (as in 540). If the write mutex is still being held (shown as the positive exit from 550) when the patience threshold has been met (shown as the positive exit from 540), the method may include the acquiring reader thread blocking on the write mutex (e.g., going to sleep or being put to sleep), and sleeping until it is woken up upon the release of the write mutex, as in 560. After the acquiring reader thread has been awakened, the method may include repeating the operations illustrated in FIG. 5 (beginning at element 520) in a continuing attempt to acquire the reader-writer lock. On the other hand, if the write mutex is still being held (shown as the positive exit from 550) when the patience threshold has been met (shown as the positive exit from 540), the method may include repeating the operations illustrated in FIG. 5 (beginning at element 520) in a continuing attempt to acquire the reader-writer lock. In this case, it may be likely that the value of the owner field of the write mutex remains null long enough for the acquiring reader thread to make progress in its attempt to acquire the reader-writer lock (e.g., the method may continue at 570, with the reader thread incrementing the ingress count in the reader counter for its node, checking the owner field again as in 575, and, if the owner field is still null, entering the critical section, as in 590).

In some embodiments, if a writer thread wishes to acquire a NUMA-aware reader-writer lock, but there are reader threads holding the lock (e.g., the reader count is non-zero), the writer thread may indicate its intent to acquire the lock for writing (by taking the write mutex), and may wait for some period of time before going to sleep (thus, employing the delayed sleep approach described herein). For example, in some embodiments, the writer thread may simply spin until a patience threshold is expired and try again (e.g., without waiting for any particular condition to be met). Again note that the writer patience threshold value may be a constant value that is calculated based, at least in part, on the total amount of time that is takes for a thread to go to sleep and then to wake up in a normal workload. As noted above, when the writer takes the mutex, this may prevent any additional reader threads from acquiring the lock (in read-only mode) before the writer acquires the lock (in write mode). In some ways, this approach may be thought of as exhibiting a writer-preference policy. In some embodiments, if a writer thread wishes to acquire a NUMA-aware reader-writer lock, but there are reader threads holding the lock (e.g., the reader count is non-zero), the writer thread may indicate its intent to acquire the lock for writing (by taking the write mutex), and may wait for some period of time (e.g., spinning on the reader count until it is zero or until a writer patience value is met) before going to sleep (thus, employing the delayed sleep approach described herein).

Figure 6:
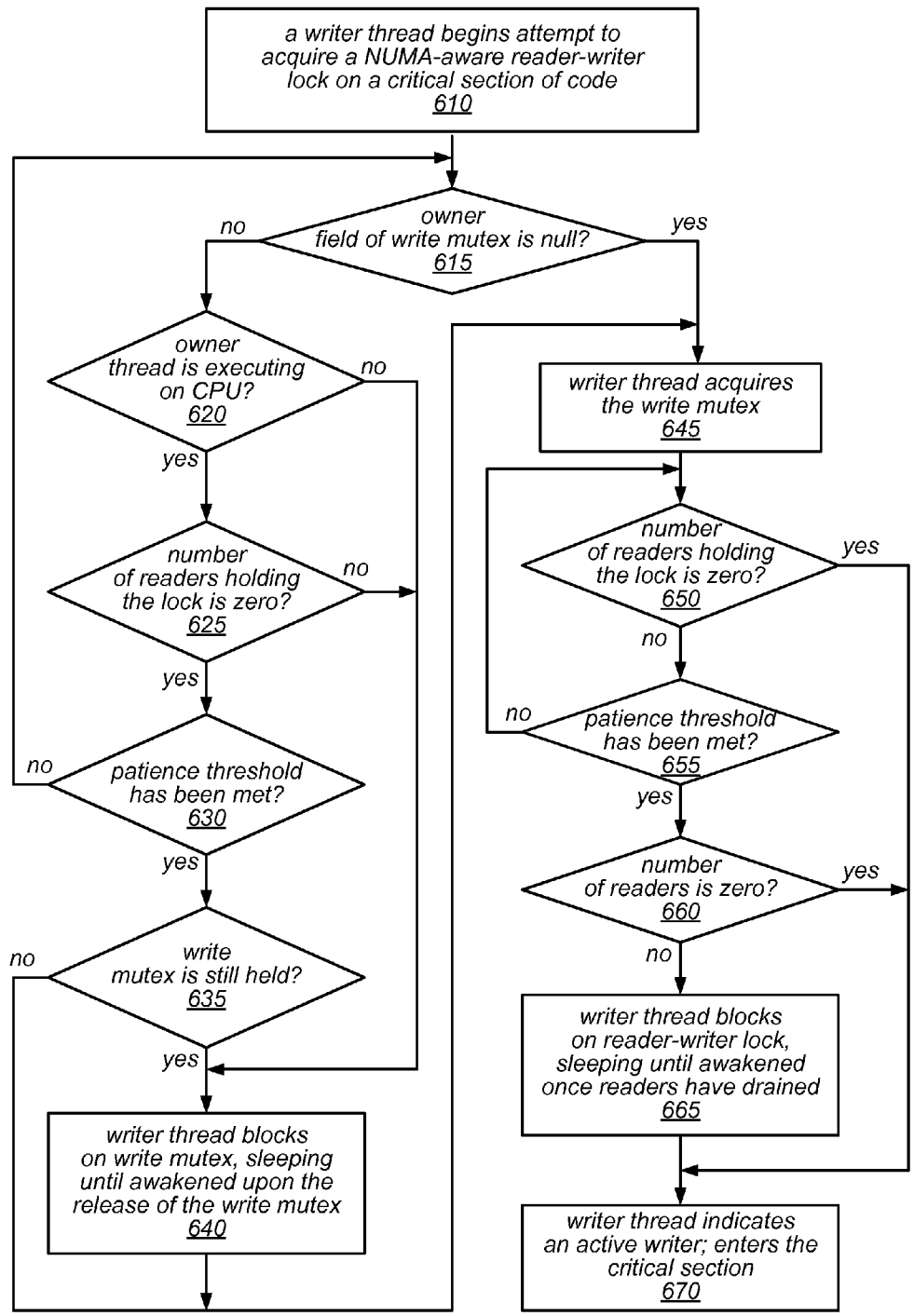
FIG. 6 is a flow diagram illustrating one embodiment of a method for a writer thread to acquire a NUMA-aware reader-writer lock, as described herein.

One embodiment of a method for a writer thread to acquire a NUMA-aware reader-writer lock is illustrated by the flow diagram in FIG. 6. As illustrated at 610, in this example, the method may include a writer thread beginning an attempt to acquire a NUMA-aware reader-writer lock on a critical section of code for writing. If the owner field of the write mutex portion of the reader-writer lock is null, indicating that no thread currently holds, or intends to acquire, the lock for writing (shown as the positive exit from 615), the method may include the acquiring writer thread acquiring the write mutex, as in 645. Once the acquiring writer thread has acquired the write mutex, the method may include determining whether the number of reader threads currently holding the lock for reading is zero, as in 650. If the number of reader threads holding the lock is zero (shown as the positive exit from 650), the method may include the acquiring writer thread indicating its presence as an active writer (e.g., by writing to the owner field of the write mutex) and entering the critical section (as in 670).

In this example, if (after the acquiring writer thread has acquired the write mutex) the number of reader threads currently holding the lock is non-zero (shown as the negative exit from 650), the method may include employing the delayed sleep approach described above. For example, the method may include the acquiring writer thread spinning until a patience threshold has been met or until the number of reader threads holding the lock is zero before continuing its attempt to acquire the reader-writer lock. This is illustrated in FIG. 6 by the feedback from the negative exit of 655 to the input of 650. Once the patience threshold has been met (shown as the positive exit from 655), the method may include checking the number of reader threads again. If the number of reader threads is still non-zero (shown as the negative exit from 660), the method may include the acquiring writer thread blocking on the reader-writer lock (e.g., going to sleep or being put to sleep), and sleeping until it is woken up once all of the reader threads that held the lock for reading have completed their critical sections and released the lock for reading (as in 665). The method may then include the acquiring writer thread indicating its presence as an active writer (e.g., by writing to the owner field of the write mutex) and entering the critical section (as in 670). Otherwise, if, after exhausting the patience threshold, the number of reader threads holding the lock is zero (indicating that all of the reader threads that held the lock for reading have completed their critical sections and released the lock for reading), shown as the positive exit from 660, the method may include the acquiring writer thread indicating its presence as an active writer (e.g., by writing to the owner field of the write mutex) and entering the critical section (as in 670) without first blocking on the reader-writer lock.

As illustrated in this example, if the owner field of the write mutex is not null (i.e., if a writer thread has already acquired the lock for writing or indicated an intent to acquire the lock by writing to this field), the method may include the acquiring writer thread determining whether the owner thread (another writer thread) is currently executing on a processor in the system. This is illustrated in FIG. 6 by the negative exit from 615 and element 620. If the owner thread is not currently executing on one of the processors in the system (shown as the negative exit from 620), the method may include the acquiring writer thread blocking on the write mutex (e.g., going to sleep or being put to sleep), and sleeping until it is woken up upon the release of the write mutex, as in 640, after which the method may proceed at 645, as in the case that the owner field was null to begin with.

Similarly, if the owner thread is currently executing on a processor in the system (shown as the positive exit from 620), and the number of reader threads holding the lock is non-zero (shown as the negative exit from 625), the method may include the acquiring writer thread blocking on the write mutex (e.g., going to sleep or being put to sleep), and sleeping until it is woken up upon the release of the write mutex, as in 640, after which the method may proceed at 645, as in the case that the owner field was null to begin with. Otherwise, if the number of reader threads holding the lock is zero (shown as the positive exit from 625), the method may include employing the delayed sleep approach described above. For example, the method may include the acquiring writer thread spinning until the owner field is null (shown as the positive exit from 615), until the owner thread is no longer executing on a processor (shown as the negative exit from 620), until the number of reader threads is non-zero (shown as the negative exit from 630), or until a patience threshold has been met (shown as the positive exit from 630). This is illustrated in FIG. 6 by the path from the negative exit of 615 to 620, the positive exit from 620 to 625, the positive exit of 625 to 630 and the negative exit from 630 to 615. As illustrated in this example, once the patience threshold has been met (assuming the patience threshold is met prior to the number of reader threads being zero or the owner thread no longer executing on a processor), the method may include checking the write mutex again. At this point if the write mutex is no longer held (shown as the negative exit from 635), the method may proceed at 645, as in the case that the owner field was null to begin with. Otherwise, if the write mutex is still held (shown as the positive exit from 635), the method may include the acquiring writer thread blocking on the write mutex (e.g., going to sleep or being put to sleep), and sleeping until it is woken up upon the release of the write mutex (as in 640), after which the method may proceed at 645, as in the case that the owner field was null to begin with.

As previously noted, when a reader thread exits the reader-writer lock, it may increment an egress counter (e.g., rd_out). In some embodiments, the reader thread may also determine whether a writer thread has indicated an intent to take the lock (e.g., by checking whether the write mutex is null or identifies a writer thread) and/or may determine whether it is the last reader thread that holds the lock. If there is no waiting writer thread, or if the reader thread is not last reader thread, the reader thread may just exit the lock. If there is a waiting writer and the reader thread is the last reader thread that holds the lock, the reader thread may wake up the waiting writer thread.

Figure 7:
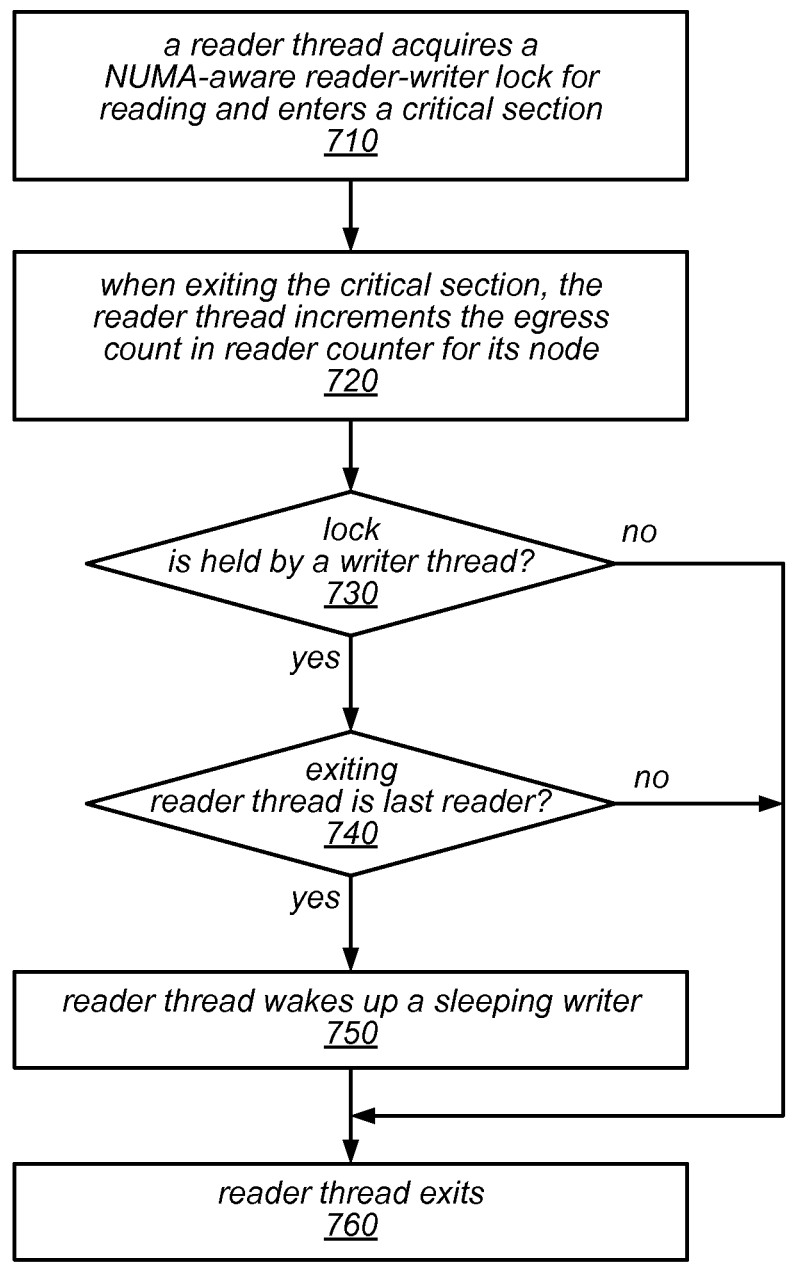
FIG. 7 is a flow diagram illustrating one embodiment of a method for a reader thread to release a NUMA-aware reader-writer lock, as described herein.

One embodiment of a method for a reader thread to release a NUMA-aware reader-writer lock is illustrated by the flow diagram in FIG. 7. As illustrated at 710, in this example, the method may include a reader thread acquiring a NUMA-aware reader-writer lock for reading and entering a critical section associated with the lock, as described herein. The method may include the releasing reader thread, when exiting the critical section, incrementing an egress count in the reader counter for its node, as in 720. If the reader-writer lock is not currently held by a writer thread (e.g., if no writer thread has indicated an intent to acquire the lock for writing), the method may include the releasing (exiting) reader thread exiting the critical section without taking any other action. This is illustrated in FIG. 7 by the path from the negative exit of 730 to 760.

On the other hand, if the lock is currently held by a writer thread (e.g., indicating that the writer thread intends to acquire the lock for writing), the method may include determining whether the releasing reader thread was the last reader thread that held the lock. This is illustrated in FIG. 7 by the positive exit from 730 and element 740. If the releasing (exiting) reader thread is not the last reader thread that holds the lock (shown as the negative exit from 740), the method may include the releasing (exiting) reader thread exiting the critical section without taking any other action (as in 760). However, if the releasing (exiting) reader thread was the last reader thread that held the lock (shown as the positive exit from 740), the method may include the releasing (exiting) reader thread waking up any (one) sleeping writer thread (as in 750) and exiting the critical section without taking any other action (as in 760).

Note that the selection of a particular one of multiple waiting writer threads to wake up (if more than one writer is waiting) may be dependent on an applicable policy. For example, in various embodiments, the NUMA-aware reader-writer lock may employ a FIFO policy, a strict priority policy, a policy that is dependent on the NUMA node on which the writer threads are executing, a round-robin policy, or any other suitable policy or combination of policies when deciding which reader threads or writer threads should be woken up. In one example, a NUMA-aware reader-writer lock may employ a hybrid of a round-robin policy and a strict priority policy to decide which thread should be woken up. In this example, an exiting writer thread may grant the lock to any and all reader threads of the same or higher priority than the highest priority blocked writer thread. Note that in some embodiments, an exiting reader thread may never wake up a blocked reader thread.

Figure 8:
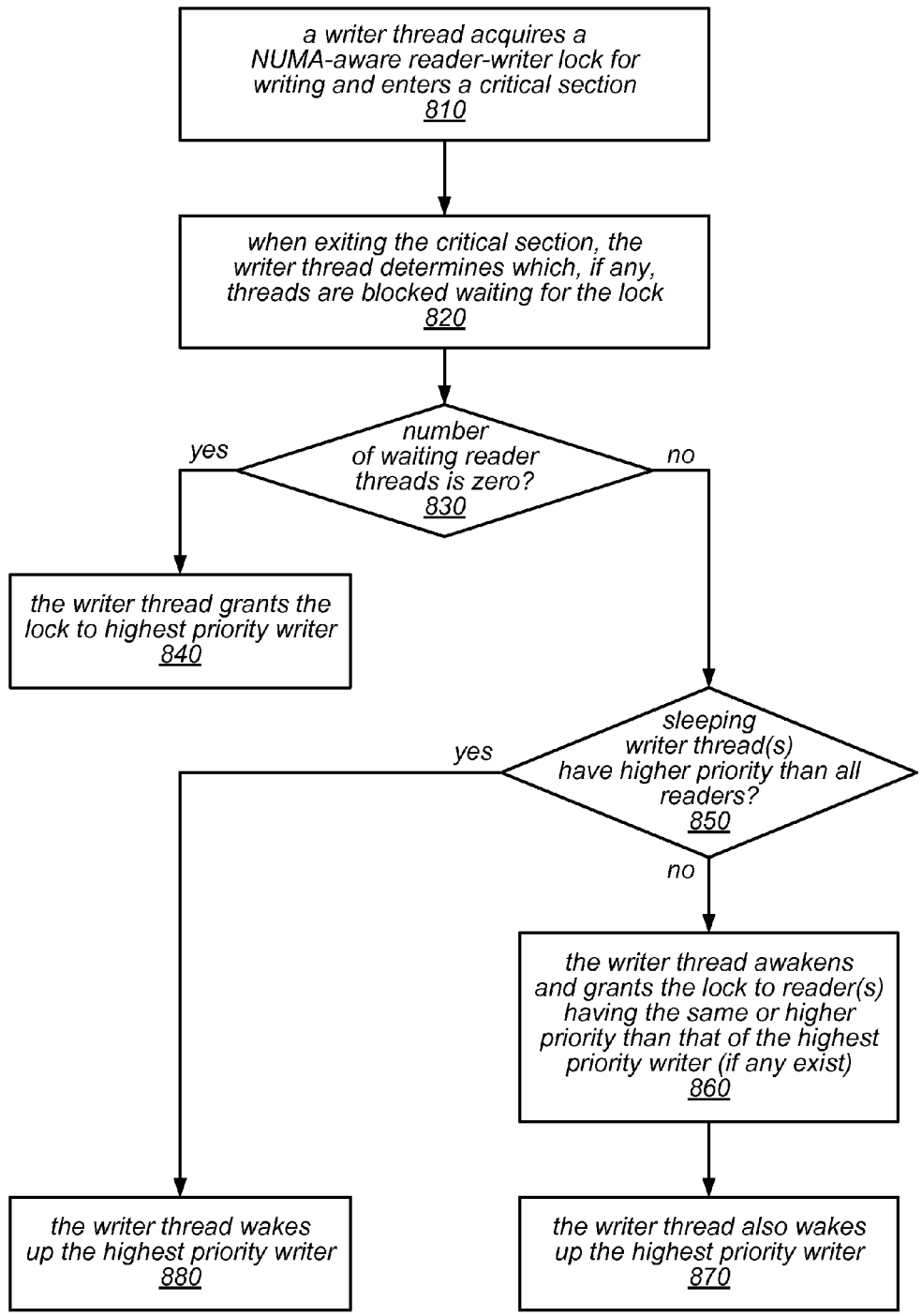
FIG. 8 is a flow diagram illustrating one embodiment of a method for a writer thread to release a NUMA-aware reader-writer lock, as described herein.

One embodiment of a method for a writer thread to release a NUMA-aware reader-writer lock is illustrated by the flow diagram in FIG. 8. As illustrated at 810, in this example, the method may include a writer thread acquiring a NUMA-aware reader-writer lock for writing and entering a critical section, as described herein. The method may also include the releasing (exiting) writer thread, when exiting the critical section, determining which, if any, threads are blocked waiting for the lock, as in 820. If the number of waiting reader threads is zero (shown as the positive exit from 830), the method may include the exiting writer thread granting the lock to the highest priority writer that is blocked waiting for the lock (as in 840). If the number of waiting reader threads is non-zero (shown as the negative exit from 830), the method may include determining the relative priorities of waiting reader threads and waiting writer threads.

If one or more waiting (sleeping) writer thread(s) have a higher priority than all reader threads that are blocked waiting for the lock (shown as the positive exit of 850), the method may include the releasing (exiting) writer thread waking up the highest priority writer thread (e.g., only the highest priority writer thread), as in 880. On the other hand, if no waiting (sleeping) writer threads have a higher priority than all waiting (sleeping) reader threads, or if there are no waiting (sleeping) writer threads (shown as the negative exit from 850), the method may include the releasing (exiting) writer thread waking up and granting the lock to one or more waiting (sleeping) reader threads that have a priority that is the same as or higher than that of the highest priority waiting writer, if any such reader threads exist (as in 860). The method may also include the releasing (exiting) writer thread waking up the highest priority waiting (sleeping) writer thread (as in 870).

In various embodiments, the NUMA-aware reader-writer locks described herein may (or may not) include support for reader re-entrancy for threads trying to acquire the lock as a reader. As previously noted, this feature may allow threads that have already obtained a lock in read-only mode to re-enter the lock as a reader thread (without first releasing the lock) even if there are waiting writer threads. In some embodiments in which reader re-entrancy is supported, if an acquiring reader thread already holds the lock for reading, it may enter the critical section (without an error condition being produced or returned). If the thread has not already acquired the lock for reading, it may yield to waiting writer threads, if any exist. As previously noted, this feature of the NUMA-aware reader-writer lock may be useful in long code paths in which, at a particular point in the code, it may not be known whether the reader-writer lock has already been acquired by the reader thread.

In some embodiments that support reader re-entrancy, each thread may maintain a list of locks that it has taken as a reader along with a respective count value indicating the number of times that the thread has taken each of the locks as a reader. In such embodiments, each thread may always know which locks it has taken as a reader and how many times it has acquired each one. Since it may not be known (prior to runtime) how many elements there may be in any particular list of reader locks, such as list cannot be implemented using a fixed-size array. In some embodiments, the list of reader locks taken by a particular thread may be implemented as a linked list of one or more fixed-size arrays (blocks). In such embodiments, the first block of the linked list may be allocated at thread creation. Since the thread may take multiple locks as a reader at the same time, the list may grow. Therefore, once all of the list elements of the first block (array) have been populated, one or more additional blocks (arrays) of list elements may be created, as required. In some embodiments, the linked list may be destroyed when the thread is destroyed. Note that new blocks (arrays) may need to be allocated in the list while the thread is attempting to acquire a reader-reentrant NUMA-aware reader-writer lock as a reader. In some embodiments, a special flag may be set while performing this allocation, e.g., in order to inform memory management processes and avoid memory related issues (e.g., not having enough free memory while acquiring the lock).

In some embodiments, each element of the linked list may include a pointer to a NUMA-aware reader-writer lock that has been taken by the particular thread as a reader, and a count value indicating the number of times the thread has taken the lock as a reader. This is illustrated in the example pseudo-code below.

```
typedef struct _rw_reentrd_elem {
    krwnumalock_t *rwrr_lock;
    int rwrr_rd_count;
} rw_reentrd_elem_t;
```

As noted above, in some embodiments, the list of reader locks taken by a particular thread may be arranged in a linked list of blocks (arrays) of fixed size. As illustrated in the example pseudo-code below, each block (array) of this linked list will contain a fixed number of list elements such as the list element shown above, where the number of list elements in each block (array) is shown in the code as the constant RWNUMA_REENTRRD_BLOCK_SZ.

```
typedef struct _rw_reentrd {
    struct _rw_reentrd   *rwrrblk_next;
    rw_reentrd_elem_t    rwrrblk_rd[RWNUMA_REENTRRD_BLOCK_SZ];
} rw_reentrd_t;
```

Figure 9:
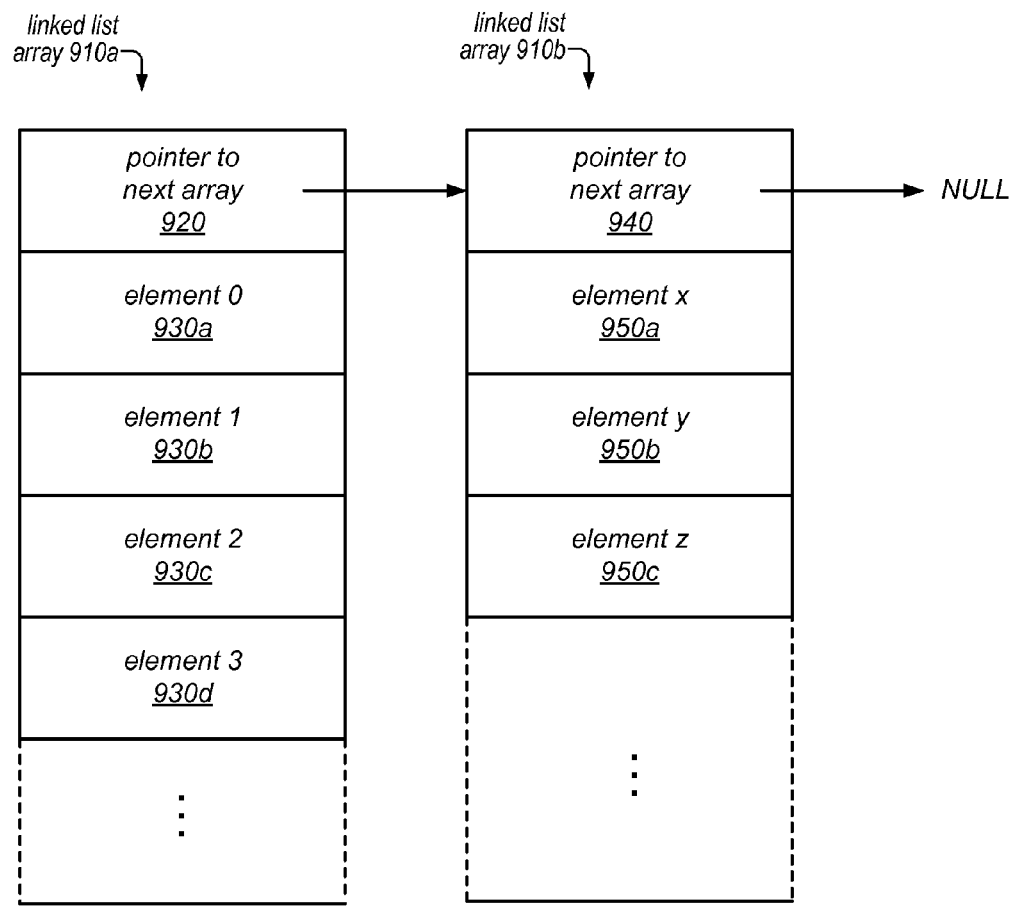
FIG. 9 is a block diagram illustrating one embodiment of a linked list of reader locks taken by a given thread.

One embodiment of a linked list of reader locks taken by a given thread is illustrated by the block diagram in FIG. 9. As illustrated in this example, each element 910 of the linked list may itself be an array of elements, the first of which includes a pointer to the next array in the linked list. For example, element 920 in one such array of a linked list (linked list array 910*a*) includes a pointer to the next array in the linked list (linked list array 910*b*). In this example, since linked list array 910*b* is the last array in the linked list, element 940 (which would include a pointer to the next array in the linked list, if one existed) includes a NULL pointer. In this example, each of the elements 930 in linked list array 910*a* and elements 950 in linked list array 910*b* indicates a lock that has been acquired by the given thread. More specifically, each of the elements 930 and 950 includes a pointer to a lock and a value indicating the number of times that the given thread has taken the lock.

In some embodiments, acquiring a reader re-entrant NUMA-aware reader-writer lock for writing and releasing the reader re-entrant NUMA-aware reader-writer lock (by a writer thread) may be performed in the same manner as acquiring and releasing a NUMA-aware reader-writer lock that does not support reader re-entrancy (by a writer thread). However, acquiring a reader re-entrant NUMA-aware reader-writer lock for reading and releasing the reader re-entrant NUMA-aware reader-writer lock (by a reader thread) may be different than acquiring and releasing a NUMA-aware reader-writer lock that does not support reader re-entrancy (by a reader thread). For example, the lock acquisition operation may include adding a lock element to the list or incrementing the reader count for the lock element (if it already exists on the list). The lock release operation may include decrementing the reader count for the lock element and (only if the reader count is zero after being decremented), releasing the lock. Note that in embodiments that support reader re-entrancy, a NUMA-aware reader-writer lock may be acquired again as a reader, but there must eventually be a lock exit (and corresponding decrement of a read indicator) for each lock entry (and corresponding increment of the read indicator).

Figure 10:
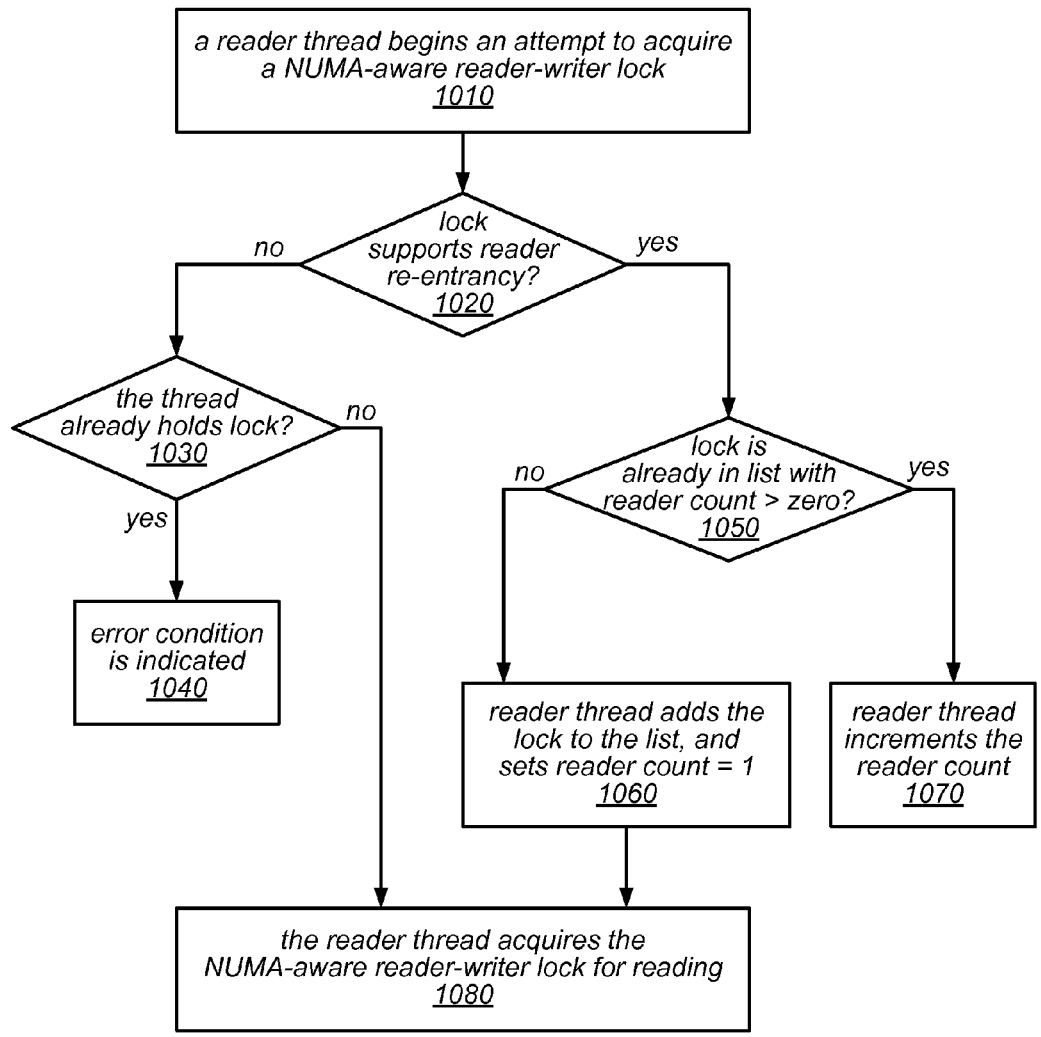
FIG. 10 is a flow diagram illustrating one embodiment of a method for a reader thread to acquire a NUMA-aware reader-writer lock that may or may not support reader re-entrancy, as described herein.

One embodiment of a method for a reader thread to acquire a NUMA-aware reader-writer lock that may or may not support reader re-entrancy is illustrated by the flow diagram in FIG. 10. As illustrated at 1010, in this example, the method may include a reader thread beginning an attempt to acquire a NUMA-aware reader-writer lock. If the NUMA-aware reader-writer lock does not support reader re-entrancy or if a reader re-entrancy feature of the lock is not enabled (shown as the negative exit from 1020), and the acquiring reader thread does not already hold the lock (shown as the negative exit from 1030), the method may include the reader thread acquiring the lock for reading (as in 1080). However, if the NUMA-aware reader-writer lock does not support reader re-entrancy or if a reader re-entrancy feature of the lock is not enabled (shown as the negative exit from 1020), and the acquiring reader thread already holds the lock (shown as the positive exit from 1030), the method may include producing and/or returning an indication of an error condition (as in 1040).

On the other hand, if the NUMA-aware reader-writer lock supports reader re-entrancy or if a reader re-entrancy feature of the lock is enabled (shown as the positive exit from 1020), the method may include determining whether the lock is already included in a list of locks that have been acquired by the reader thread and that an entry for the lock indicates a reader count greater than zero (as in 1050). If the lock is already included in the list with a reader count greater than zero (shown as the positive exit from 1050), the method may include the reader thread incrementing the reader count in the entry (as in 1070) and continuing execution while holding the lock for reading (e.g., entering a critical section associated with the lock and/or accessing a shared resource that is associated with the lock). Otherwise, if the lock is not already included in the list with a reader count greater than zero (e.g., if the lock is not included in the list or is included in the list with a reader counter less than or equal to zero), the method may include the reader thread adding the lock to the list, and setting the reader count for the lock to a value of 1 (to indicate that the reader thread intends to holds the lock for reading). This is illustrated in FIG. 10 as the negative exit from 1050 and 1060. The method may then include the reader thread acquiring the NUMA-aware reader-writer lock for reading (as in 1080).

Figure 11:
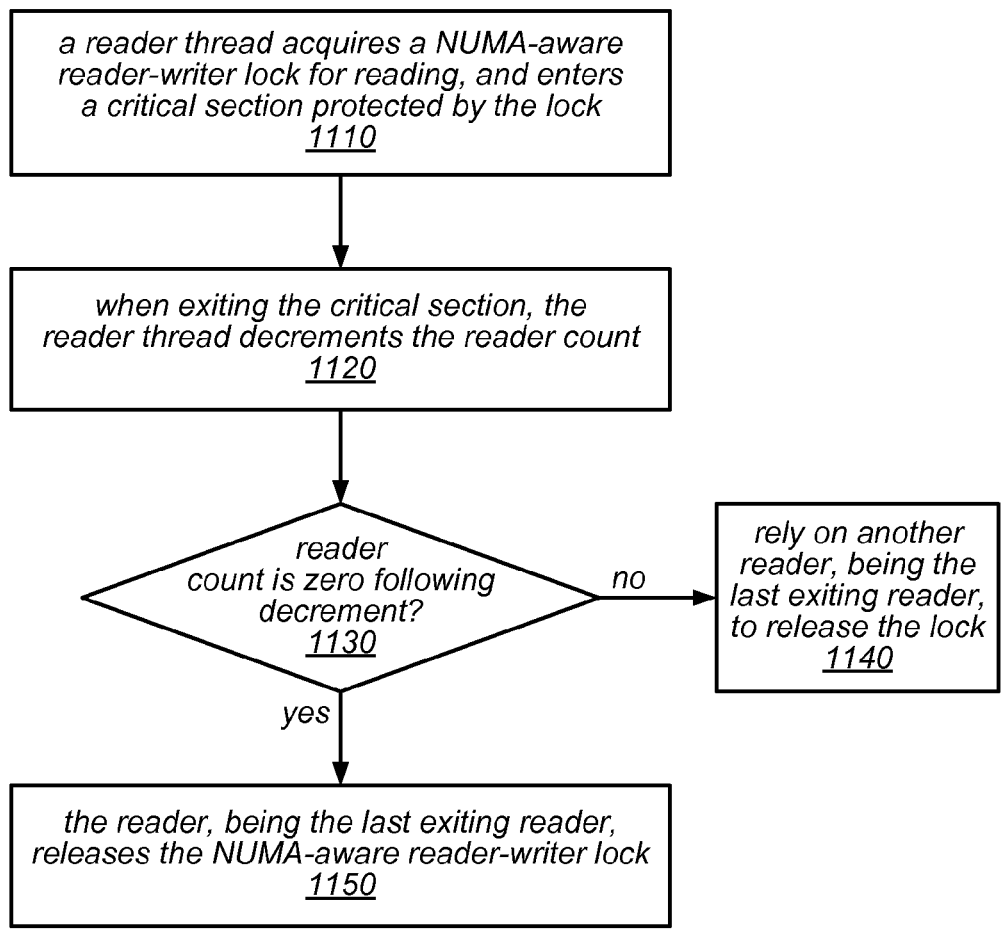
FIG. 11 is a flow diagram illustrating one embodiment of a method for a reader thread to release a NUMA-aware reader-writer lock that may or may not support reader re-entrancy, as described herein, as described herein.

One embodiment of a method for a reader thread to release a NUMA-aware reader-writer lock that may or may not support reader re-entrancy (or for which a reader re-entrancy feature may or may not be enabled) is illustrated by the flow diagram in FIG. 11. As illustrated at 1110, in this example, the method may include a reader thread acquiring a NUMA-aware reader-writer lock for reading, and entering a critical section protected by the lock, as described herein. The method may include the reader thread, when exiting the critical section, decrementing the reader count for the lock in a list of locks that are held by the reader thread (as in 1120). The method may include determining whether the reader count is zero following the decrement operation (as in 1130). If the reader count is zero after being decremented by the reader thread (shown as the positive exit from 1130), the method may include the reader thread, being the last exiting reader, releasing the NUMA-aware reader-writer lock (as in 1150). On the other hand, if the reader count is not zero after being decremented by the reader thread (shown as the negative exit from 1130), the method may include the reader thread relying on another reader, being the last exiting reader, to release the lock (as in 1140). In other words, the releasing reader thread may take no action to release the lock if there are still other reader threads holding the lock.

Debugging Support

As previously noted, in some embodiments, the NUMA-aware reader-writer lock described herein may (optionally, e.g., according to a compiler directive, switch, or other mechanism) include additional fields to support debugging operations. As illustrated in the example lock structure pseudo-code above, the header portion of the lock structure may (when instantiated in a debug mode) include a field in which all threads that have acquired the lock in read-only mode are listed, and a reader list mutex field that may be used to maintain exclusive write access to this list of reader threads. In some embodiments, a debug version of the NUMA-aware reader-writer locks described herein may also include a function that checks for possible re-entrancy of threads as readers (which may only be allowed for reader re-entrant versions of the lock) or as writers (which may never be allowed). Because of these additional fields and added functionality, this debug version of the NUMA-aware reader-writer lock described herein may be significantly slower than non-debug versions of the lock.

Example System

Figure 12:
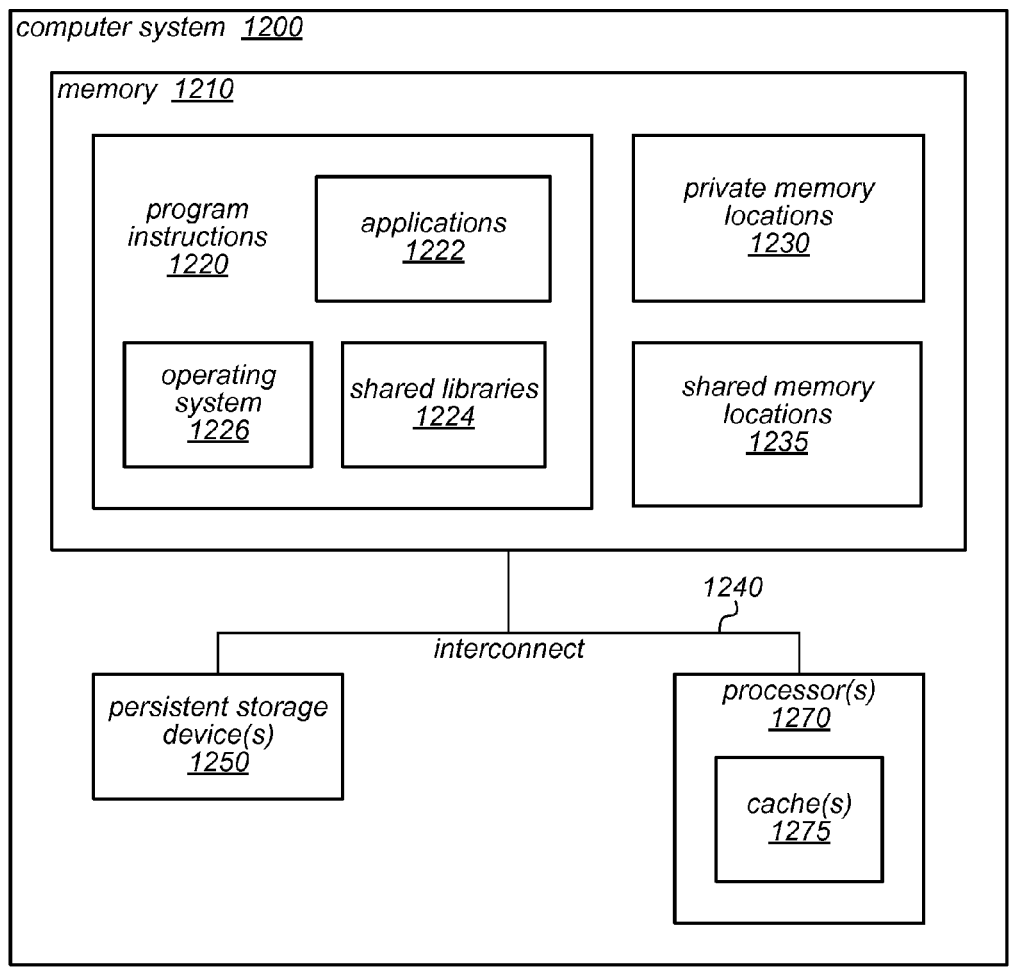
FIG. 12 illustrates a computing system configured to implement scalable adaptive reader-writer locks, according to various embodiments.

FIG. 12 illustrates a computing system configured to implement the methods described herein, according to various embodiments. The computer system 1200 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The mechanisms for implementing NUMA-aware cohort locking and/or NUMA-aware reader-writer locks, as described herein, may be provided as a computer program product, or software, that may include a non-transitory, computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 1200 may include one or more processors 1270; each may include multiple cores, any of which may be single or multi-threaded. For example, as illustrated in FIG. 1, multiple processor cores may be included in a single processor chip (e.g., a single processor 1270 or processor chip 110), and multiple processor chips may be included on a CPU board, two or more of which may be included in computer system 1200. Each of the processors 1270 may include a hierarchy of caches, in various embodiments. For example, as illustrated in FIG. 1, each processor chip 110 may include multiple L1 caches (e.g., one per processor core) and one or more other caches (which may be shared by the processor cores on the processor chip). The computer system 1200 may also include one or more persistent storage devices 1250 (e.g. optical storage, magnetic storage, hard drive, tape drive, solid state memory, etc) and one or more system memories 1210 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 12 (e.g., video cards, audio cards, additional network interfaces, peripheral devices, a network interface such as an ATM interface, an Ethernet interface, a Frame Relay interface, etc.)

The one or more processors 1270, the storage device(s) 1250, and the system memory 1210 may be coupled to the system interconnect 1240. One or more of the system memories 1210 may contain program instructions 1220. Program instructions 1220 may be executable to implement one or more applications 1222 (which may include one or more accesses to a critical section of code or shared resource protected by a NUMA-aware cohort lock or a NUMA-aware reader-writer lock, as described herein), shared libraries 1224, or operating systems 1226. In some embodiment, program instructions 1220 may be executable to implement a contention manager (not shown). Program instructions 1220 may be encoded in platform native binary, any interpreted language such as Java™ byte-code, or in any other language such as C/C++, Java™, etc or in any combination thereof. The program instructions 1220 may include functions, operations and/or other processes for implementing NUMA-aware cohort locking and/or NUMA-aware reader-writer locks, as described herein. Such support and functions may exist in one or more of the shared libraries 1224, operating systems 1226, or applications 1222, in various embodiments. The system memory 1210 may further comprise private memory locations 1230 and/or shared memory locations 1235 where data may be stored. For example, shared memory locations 1235 may store data accessible to concurrently executing threads, processes, or transactions, in various embodiments. In addition, the system memory 1210 and/or any of the caches of processor(s) 1270 may, at various times, store lock metadata (e.g., lock state information or lock structure header information, identifiers of successor threads, and/or various counters or flags, as described herein), threshold values, policy parameter values, maximum count values, lists or queues of pending, active, and/or passive threads (including queues of sleeping reader threads and/or writer threads), lists of locks currently held for reading by particular threads, one or more reader counters (e.g., a node-local reader counter), and/or any other data usable in implementing the techniques described herein, some of which may include values that are configurable by the programmer or by a user.

Although the embodiments above have been described in considerable detail, numerous variations and modifications will become apparent to those skilled in the art once the above disclosure is fully appreciated. For example, although many of the embodiments are described in terms of particular types of locks and structures and particular locking algorithms and policies, it should be noted that the techniques and mechanisms disclosed herein for implementing NUMA-aware lock cohorting and NUMA-aware reader-writer locks may be applicable in other contexts in which critical sections of code and/or shared resources may be protected by other types of locks/structures under different locking algorithms/policies, or in which cohort locks or NUMA-aware reader-writer locks are constructed from different types of locks and structures than those described in the examples herein. It is intended that the following claims be interpreted to embrace all such variations and modifications.

What is claimed:

1. A method, comprising:
    performing by a computer:
        beginning execution of a multithreaded application that comprises one or more requests to acquire a reader-writer lock, wherein the reader-writer lock controls write access to a critical section of code by concurrently executing threads of the application and further controls access to the critical section of code in read-only mode, wherein the reader-writer lock allows at most one writer thread to hold the reader-writer lock for writing at a time, and wherein the reader-writer lock allows multiple reader threads to hold the reader-writer lock in read-only mode at the same time;

a given thread of the application requesting acquisition of the reader-writer lock;

determining that another thread has acquired the reader-writer lock;

determining one of a plurality of available actions to be taken in response to said requesting;

taking the determined action; and the other thread releasing the reader-writer lock, wherein said releasing comprises waking one or more reader threads wishing to acquire the reader-writer lock that are in a sleep state and a single writer thread of a plurality of writer threads wishing to acquire the reader-writer lock that are in a sleep state.

2. The method of claim 1, wherein determining the one of the plurality of available actions to be taken comprises determining whether the other thread that has acquired the reader-writer lock is currently executing the critical section of code on a processor core;

wherein said determining one of the plurality of available actions comprises selecting from among the plurality actions comprising the given thread beginning a spin-type operation, putting the given thread in a sleep state, wherein in the sleep state the given thread does not consume processor resources, and the given thread acquiring the reader-writer lock without first performing a spin-type operation and without first being put in sleep state;

wherein the given thread is a reader thread;

wherein the other thread is a reader thread;

wherein the determined action comprises the given thread acquiring the reader-writer lock in read-only mode without first performing the spin-type operation and without first being put in sleep state, wherein said acquiring comprises incrementing a read indicator portion of the reader-writer lock; and wherein the method further comprises the given thread entering the critical section of code.

3. The method of claim 2, wherein each of the concurrently executing threads of the application executes on one of a plurality of processor cores that share a memory and that are located on a single node, and wherein the single node is one of a plurality of nodes comprising processor cores on which threads of the multithreaded application are executing;

wherein the read indicator portion of the reader-writer lock comprises a plurality of node-local reader counters; and wherein said incrementing the reader counter portion of the reader-writer lock comprises incrementing a reader counter that is local to a node comprising a processor core on which the given thread is executing.

4. The method of claim 2, further comprising:

the given thread exiting the critical section of code, wherein said exiting comprises:

decrementing the read indicator portion of the reader-writer lock;

determining whether any other reader threads hold the reader-writer lock; and in response to determining that no other reader threads hold the reader-writer lock, releasing the reader-writer lock.

5. The method of claim 2, further comprising:

the given thread exiting the critical section of code; and subsequent to said exiting, and without first releasing the reader-writer lock:

the given thread requesting acquisition of the reader-writer lock in read-only mode; and determining that the thread already holds the lock.

6. The method of claim 1, wherein each of the concurrently executing threads of the application executes on a processor core located on a respective one of a plurality of nodes, wherein each node comprises a plurality of processor cores on which threads of the multithreaded application are executing;

wherein a read indicator portion of the reader-writer lock comprises a plurality of node-local reader counters;

wherein said determining that the other thread has acquired the reader-writer lock comprises determining that an aggregate value representing a sum of the values of the plurality of node-local reader counters is non-zero.

7. The method of claim 1, wherein the other thread is not currently executing the critical section of code on a processor core;

wherein the determined action comprises putting the given thread in a sleep state; and wherein the other thread releasing the reader-writer lock further comprises:

waking the given thread.

8. The method of claim 7, wherein said putting the given thread in a sleep state comprises placing the given thread on a turnstile sleep queue associated with the reader-writer lock.

9. The method of claim 7, further comprising, subsequent to said waking:

the given thread acquiring the reader-writer lock; and the given thread entering the critical section of code.

10. The method of claim 7, wherein the other thread is a writer thread;

wherein the method further comprises:

the one or more reader threads acquiring the reader-writer lock in read-only mode such that the one or more reader threads hold the reader-writer lock in read-only mode at the same time.

11. The method of claim 10, wherein the method further comprises, subsequent to waking the one of the one or more writer threads, the one of the one or more writer threads attempting to acquire the reader-writer lock.

12. The method of claim 1, wherein the given thread is a reader thread;

wherein the other thread is a writer thread;

wherein the other thread is currently executing the critical section of code on a processor core; and wherein the determined action comprises the given thread beginning a spin-type operation in which the given thread spins on a portion of the reader-writer lock indicating that a thread has acquired the reader-writer lock for writing or has indicated an intent to acquire the reader-writer lock for writing.

13. The method of claim 12, further comprising:

the given thread spinning on the portion of the reader-writer lock until the portion of the reader-writer lock indicates that no thread has acquired the reader-writer lock for writing or has indicated an intent to acquire the reader-writer lock for writing, or until an amount of time equal to a pre-determined reader patience threshold value has passed; and in response to the amount of time equal to the pre-determined reader patience threshold value passing without the portion of the reader-writer lock indicating that no thread has acquired the reader-writer lock for writing or has indicated an intent to acquire the reader-writer lock for writing, putting the given thread in a sleep state.

14. The method of claim 13, wherein the pre-determined reader patience threshold value is dependent on one or more of: an amount of time to put a thread in a sleep state, or an amount of time to wake a thread that was previously put in a sleep state.

15. The method of claim 1,
wherein the given thread is a writer thread;
wherein the other thread is currently executing the critical section of code on a processor core; and
wherein the determined action comprises the given thread beginning a spin-type operation in which the given thread spins on a portion of the reader-writer lock indicating whether any reader threads currently hold the reader-writer lock in read-only mode.

16. The method of claim 15, further comprising:
the given thread spinning on the portion of the reader-writer lock until the portion of the reader-writer lock indicates that no reader threads hold the reader-writer lock in read-only mode, or until an amount of time equal to a pre-determined writer patience threshold value has passed;
subsequent to the given thread spinning for an amount of time equal to the pre-determined writer patience threshold value, the given thread determining that one or more threads still hold the reader-writer lock in read-only mode; and
in response to determining that one or more threads still hold the reader-writer lock in read-only mode, putting the given thread in a sleep state.

17. The method of claim 16, wherein the pre-determined writer patience threshold value is dependent on one or more of: an amount of time to put a thread in a sleep state, or an amount of time to wake a thread that was previously put in a sleep state.

18. A system, comprising:
a plurality of nodes, each of which comprises two or more processor cores that support multithreading and that share a local memory;
a system memory coupled to the plurality of nodes;
wherein the system memory stores program instructions that when executed on one or more processor cores in the plurality of nodes cause the one or more processor cores to perform:
beginning execution of a multithreaded application that comprises one or more requests to acquire a reader-writer lock, wherein the reader-writer lock controls write access to a critical section of code by concurrently executing threads of the application and further controls access to the critical section of code in read-only mode, wherein the reader-writer lock allows at most one writer thread to hold the reader-writer lock for writing at a time, and wherein the reader-writer lock allows multiple reader threads to hold the reader-writer lock in read-only mode at the same time;
a given thread of the application requesting acquisition of the reader-writer lock;
determining that another thread has acquired the reader-writer lock;
determining one of a plurality of available actions to be taken in response to said requesting;
taking the determined action; and
the other thread releasing the reader-writer lock, wherein said releasing comprises waking one or more reader threads wishing to acquire the reader-writer lock that are in a sleep state and a single writer thread of a plurality of writer threads wishing to acquire the reader-writer lock that are in a sleep state.

19. The system of claim 18,
wherein each of the concurrently executing threads of the application executes on one of the plurality of processor cores on a respective node;
wherein a read indicator portion of the reader-writer lock comprises a plurality of node-local reader counters; and
wherein said determining that the other thread has acquired the reader-writer lock comprises determining that an aggregate value representing a sum of the values of the plurality of node-local reader counters is non-zero.

20. A non-transitory, computer-readable storage medium storing program instructions that when executed on one or more computers cause the one or more computers to perform:
beginning execution of a multithreaded application that comprises one or more requests to acquire a reader-writer lock, wherein the reader-writer lock controls write access to a critical section of code by concurrently executing threads of the application and further controls access to the critical section of code in read-only mode, wherein the reader-writer lock allows at most one writer thread to hold the reader-writer lock for writing at a time, and wherein the reader-writer lock allows multiple reader threads to hold the reader-writer lock in read-only mode at the same time;
a given thread of the application requesting acquisition of the reader-writer lock;
determining that another thread has acquired the reader-writer lock;
determining one of a plurality of available actions to be taken in response to said requesting;
taking the determined action; and
the other thread releasing the reader-writer lock, wherein said releasing comprises waking one or more reader threads wishing to acquire the reader-writer lock that are in a sleep state and a single writer thread of a plurality of writer threads wishing to acquire the reader-writer lock that are in a sleep state.

\* \* \* \* \*

UNITED STATES PATENT AND TRADEMARK OFFICE
CERTIFICATE OF CORRECTION

PATENT NO. : 9,996,402 B2
APPLICATION NO. : 14/246975
DATED : June 12, 2018
INVENTOR(S) : Yadav Page 1 of 1

It is certified that error appears in the above-identified patent and that said Letters Patent is hereby corrected as shown below:

On the Title Page

On page 2, Column 2, item (56) under Other Publications, Line 44, delete "pp." and insert -- PPoPP --, therefor.

In the Specification

In Column 2, Line 51, after "core" insert -- . --.

In Column 3, Line 20, after "spinning" insert -- . --.

Signed and Sealed this
Twenty-ninth Day of January, 2019

Andrei Iancu
*Director of the United States Patent and Trademark Office*